(12) United States Patent
Marini et al.

(10) Patent No.: US 7,864,178 B2
(45) Date of Patent: Jan. 4, 2011

(54) CREATING MACHINE VISION INSPECTIONS USING A STATE DIAGRAM REPRESENTATION

(75) Inventors: Marc Marini, New Braunfels, TX (US); Nicolas Vazquez, Austin, TX (US)

(73) Assignee: National Instruments Corporation, Austin, TX (US)

( * ) Notice: Subject to any disclaimer, the term of this patent is extended or adjusted under 35 U.S.C. 154(b) by 405 days.

(21) Appl. No.: 11/550,510

(22) Filed: Oct. 18, 2006

(65) Prior Publication Data
US 2007/0168943 A1 Jul. 19, 2007

Related U.S. Application Data

(60) Provisional application No. 60/734,882, filed on Nov. 9, 2005.

(51) Int. Cl.
- *G06T 11/20* (2006.01)
- *G06F 3/00* (2006.01)
- *G06F 3/048* (2006.01)

(52) U.S. Cl. .......... 345/440; 715/762; 715/763
(58) Field of Classification Search .......... 345/440; 715/762, 763
See application file for complete search history.

(56) References Cited

U.S. PATENT DOCUMENTS

| | | | |
|---|---|---|---|
| 5,331,579 A * | 7/1994 | Maguire et al. ............ 703/2 |
| 5,416,335 A * | 5/1995 | Forehand ............ 250/559.36 |
| 5,481,712 A | 1/1996 | Silver et al. |
| 5,742,504 A | 4/1998 | Meyer et al. |
| 5,862,372 A | 1/1999 | Morris et al. |
| 5,933,633 A * | 8/1999 | Good et al. ............ 717/131 |
| 5,940,296 A | 8/1999 | Meyer |
| 6,226,783 B1 | 5/2001 | Limondin et al. |
| 6,298,474 B1 | 10/2001 | Blowers et al. |
| 6,408,429 B1 | 6/2002 | Marrion, Jr. et al. |

(Continued)

OTHER PUBLICATIONS

Neil Kleinman; "The Macintosh as a Scientific/Industrial Image Processing Platform"; Advanced Imaging, Special Report: Imaging and the Macintosh/robust image databases; Apr. 1991; pp. 18-32.

(Continued)

*Primary Examiner*—Kee M Tung
*Assistant Examiner*—David T Welch
(74) *Attorney, Agent, or Firm*—Meyertons Hood Kivlin Kowert & Goetzel, P.C.; Jeffrey C. Hood; Joel L. Stevens

(57) ABSTRACT

A machine vision development environment that may utilize a control flow representation (preferably a state diagram representation) to specify and execute machine vision routines (e.g., sometimes referred to as inspection routines). A user may first create one or more machine vision routines using any of various methods. The user may then graphically specify a sequence of machine vision steps or operations, e.g., a machine vision inspection, using a state diagram representation. The state diagram representation may comprise a plurality of icons which represent states with corresponding operations or functions, such as, for example, Load Inspection, Part Ready, Run Inspection, Read Digital Input, etc. The various icons may be connected by wires that indicate control flow transitions, e.g., state transitions, among the states. The state diagram may then be executed to control the machine vision routines.

21 Claims, 23 Drawing Sheets

U.S. PATENT DOCUMENTS

| | | | |
|---|---|---|---|
| 6,522,346 B1 | 2/2003 | Meyer | |
| 6,522,993 B1* | 2/2003 | Tomko | 702/150 |
| 6,763,515 B1 | 7/2004 | Vazquez et al. | |
| 7,079,141 B2 | 7/2006 | Vazquez et al. | |
| 2002/0078422 A1* | 6/2002 | Bradley et al. | 716/1 |
| 2002/0083413 A1* | 6/2002 | Kodosky et al. | 717/109 |
| 2002/0184347 A1* | 12/2002 | Olson et al. | 709/220 |
| 2003/0132962 A1* | 7/2003 | Santori et al. | 345/762 |
| 2003/0132965 A1* | 7/2003 | Santori et al. | 345/763 |
| 2003/0227483 A1* | 12/2003 | Schultz et al. | 345/763 |
| 2004/0047509 A1* | 3/2004 | Masten | 382/218 |
| 2004/0158804 A1* | 8/2004 | Hayles | 716/6 |
| 2005/0039160 A1* | 2/2005 | Santori et al. | 717/104 |
| 2005/0039170 A1* | 2/2005 | Cifra et al. | 717/125 |
| 2005/0278059 A1* | 12/2005 | Osborn et al. | 700/181 |
| 2006/0124874 A1* | 6/2006 | Uto et al. | 250/559.45 |
| 2006/0235548 A1* | 10/2006 | Gaudette | 700/83 |
| 2007/0014467 A1* | 1/2007 | Bryll | 382/152 |

OTHER PUBLICATIONS

"Image Processing and Analysis Software for the Apple Macintosh II—User's Manual"; 1990; pp. 1-214; Optilab.

John Rizzo; "Image Analyst and Enhance"; Jul. 1990; pp. 55-58; MacUser.

Steven Rosenthal and Larry Stahlberg; "Integrated Approach to Machine Vision Application Development"; SPIE—The International Society for Optical Engineering; Nov. 1990, pp. 158-162; vol. 1386.

"Vision for Process Feedback and Control"; Jul. 3, 2000; 3 pages; Automatix News Release, www.applefritter.com/macclones/automatix/newsrelease.

"IPLab gives You complete control of your Image processing application"; IPLab—Serious Scientific Image Processing for the Macintosh II; 1992; 4 pages; Signal Analytics Corporation; Vienna, VA.

Michael S. Mort and Robert J. Fontana; "Low Cost Image Analysis Workstation Which is Menu Driven and Extensible"; SPIE—The International Society for Optical Engineering; Feb. 1990; pp. 380-389; vol. 1232.

"IPLab User's Guide"; 1991, 268 pages; Signal Analytics Corporation.

Stuart Gitlow, M.D.; "X-Ray Vision—Truvel's X-Ray scanner takes radiology out of the darkroom and puts it onto the desktop"; MacGuide Magazine; Jun. 1989, pages 89-94; vol. 2, Issue 4.

Ric Ford; "Optimage processes scientific images"; 1994; 1 page.

"Signal Analytics Brings Powerful Scientific Image Processing to the Macintosh II"; News Release; Feb. 1, 1990; 2 pages; Signal Analytics Corporation; Vienna, VA.

"Scientific Color Image Processing Takes Flight"; IPLab—Serious Image Processing for the Macintosh II, 1990; 6 pages; Signal Analytics Corporation; Vienna, VA.

"IPLab Gives You Unparalleled Value"; 1992; 6 pages; Signal Analytics Corporation; Vienna, VA.

"IPLab Brings Affordable Scientific Image Processing to the Macintosh II"; 1990; 1 page; Signal Analytics Corporation; Vienna, VA.

"A Seminar on Machine Vision & Image Analysis"; 1993; 46 pages; Automatix Inc.

Measurement and Automation Catalogue—section on Interactive Vision Software; 1999, pp. 518-520; National Instruments Corporation; Austin, TX.

"Ultimage and IPLab Spectrum"; MacUser; Jul. 1991; pp. 82-85.

"IMAQ Vision Builder Tutorial"; Jan. 1999; 73 pages; National Instruments Corp., Austin, TX.

Neil Hunt; "IDF: A graphical dataflow programming language for image processing and computer vision"; IEEE International Conference on Systems, Man and Cybernetics; Nov. 1990; pp. 351-360; vol. 4, Issue 7.

W.A. Keddy and P. Agathoklis; "DEDIP: A user-friendly environment for digital image processing algorithm development"; IEEE Pacific Rim Conference on Communications, Computers and Signal Processing; 1991; pp. 733-736; vol. 9, Issue 10.

Konstantinos Konstantinides and John R. Rasure; "The Khoros Software Development Environment for Image and Signal Processing"; IEEE Transactions on Image Processing; May 1994; pp. 243-252; vol. 3, Issue 3.

Young-Seok Sim, Chae-Seong Lim, Young-Shik Mood, and Sung-Han Park; "Design and Implementation of the Visual Programming Environment for the Distributed Image Processing"; International Conference on Image Processing; Sep. 1996; pp. 149-152.

* cited by examiner

FIG. 4
(Prior Art)

| | A | B | C | D | E | F | G | H | I |
|---|---|---|---|---|---|---|---|---|---|
| | A15= | DelayLine($A$0,B8,25,0) | | | | | | | |
| | A | B | C | D | E | F | G | H | I |
| 0 | Image | Run Demo | | | | | | | |
| 1 | | | | | | | | | |
| 2 | | | | | | | | | |
| 3 | | | | | | | | | |
| 4 | PatFind | Index | Row | Col | Angle | Scale | | | |
| 5 | Patterns | 0.000 | 215.168 | 371.934 | -12.066 | 100.000 | | | |
| 6 | | | | | | | | | |
| 7 | Caliper | Distance | Score | Pass_Fail Result | | | | | |
| 8 | Edges | 122.553 | 38.410 | 1.000 | | | | | |
| 9 | | | | | | | | | |
| 10 | Blob | Index | Row | Col | Angle | Area | Score | | |
| 11 | Blobs | 0.000 | 422.893 | 380.182 | 251.772 | 1295.000 | 100.000 | Plot | 1.000 |
| 12 | Blobs | 0.000 | 393.776 | 282.482 | 254.666 | 1051.000 | 100.000 | Plot | 1.000 |
| 13 | | | | | | | | | |
| 14 | | Last | Mean | SDev | Min | Max | | | |
| 15 | Delay | 122.565 | 122.352 | 0.924 | 119.737 | 123.047 | | | |
| 16 | | | | | | | | | |
| 17 | | | | | | | | | |
| 18 | | | | | | | | | |
| 19 | | | | | | | | | |

CREATING MACHINE VISION INSPECTIONS USING A STATE DIAGRAM REPRESENTATION

PRIORITY

This application claims benefit of priority of U.S. provisional application Ser. No. 60/734,882 titled "Creating Machine Vision Inspections Using a State Diagram Representation" filed Nov. 9, 2005, whose inventors were Marc Marini and Nicolas Vazquez.

RESERVATION OF COPYRIGHT

A portion of the disclosure of this patent document contains material to which a claim of copyright protection is made. The copyright owner has no objection to the facsimile reproduction by anyone of the patent document or the patent disclosure as it appears in the Patent and Trademark Office patent file or records, but reserves all other rights whatsoever.

FIELD OF THE INVENTION

The present invention relates to specifying machine vision methods, e.g., image processing algorithms, using a state diagram representation.

DESCRIPTION OF THE RELATED ART

Various development environments have been developed for creating machine vision or image processing (collectively referred to as "machine vision") algorithms. The term "machine vision" is used herein to refer to image processing, image analysis, and machine vision, among others. Machine vision development environments have been developed for rapidly developing image applications, e.g., for machine vision, pattern matching, shape matching, gauging, OCR, barcode reading or other applications. Such a machine vision development environment may enable a user to easily and quickly experiment with an image, applying various image processing functions in order to manipulate, process, or analyze the image.

Machine vision development environments use various programming metaphors for creating machine vision or inspection programs. For example, NI Vision Builder 1.0 up-to 2.6.1 uses a fixed flowchart representation shown in FIG. 1. ISRA Vision advertises a product named VIVA that uses a user-configurable flowchart. Matrox Imaging announced in November 2005 configurable software using a flowchart. Cognex In-Sight uses a spreadsheet paradigm to represent inspection steps, parameters and display inspection results (FIG. 4). Cognex (formerly DVT) Framework and Intellect use a table representation (FIG. 2A) as well as textual language (VBA) (FIG. 2B). DS NeuroCheck uses tree controls to represent the various visual inspection steps (FIGS. 3A-3C and 5).

SUMMARY OF THE INVENTION

One embodiment comprises a machine vision development environment that utilizes a control flow representation (preferably a state diagram representation) to manage and execute machine vision routines (e.g., sometimes referred to as visual inspection routines).

In response to user input, a plurality of icons representing states of a machine vision program may be displayed. For example, in one embodiment, a user may provide input to a graphical user interface (GUI) specifying or selecting the states, e.g., via menus, palettes, etc. Corresponding icons for the specified states may then be displayed, e.g., on a computer monitor or other display device. In some embodiments, one or more of the icons may correspond to associated operations or functions of the states of the machine vision program or process, e.g., Load Inspection, Locate Object, Measure Feature, Read Barcode, Read Digital Input, etc. These operations or functions may be applied to signals generated from a video source.

The user may also select a sequence of one or more steps or functions to be performed upon reaching the specified state. These steps or functions may include visual inspection steps. In other words, the user may associate a machine vision or inspection routine with a respective state, e.g., such that the routine may execute upon entering the respective state.

These associated vision inspection steps may be generated automatically based upon the user's interaction with an acquired image, where, for example, the user's sequence of processing steps are recorded to create the inspection routine. The icons representing the states may change their appearance, e.g. changing the icons, adding overlaid images, changing colors, etc., based on the current visual inspection step being performed, transition values, or item under inspection. In further embodiments, the user may also specify these appearance changes, e.g., via the GUI.

The user may connect the icons using an input method, e.g., a mouse, a keyboard, voice activation, touch screen, etc. The icons may be connected graphically via lines on the display of a computer system. These lines may specify and represent transitions between states. The user may specify the condition that triggers a transition from one state to another state.

BRIEF DESCRIPTION OF THE DRAWINGS

A better understanding of the present invention can be obtained when the following detailed description of the preferred embodiment is considered in conjunction with the following drawings, in which:

FIGS. 1-5 illustrate various prior art machine vision development environments;

Figure 1:
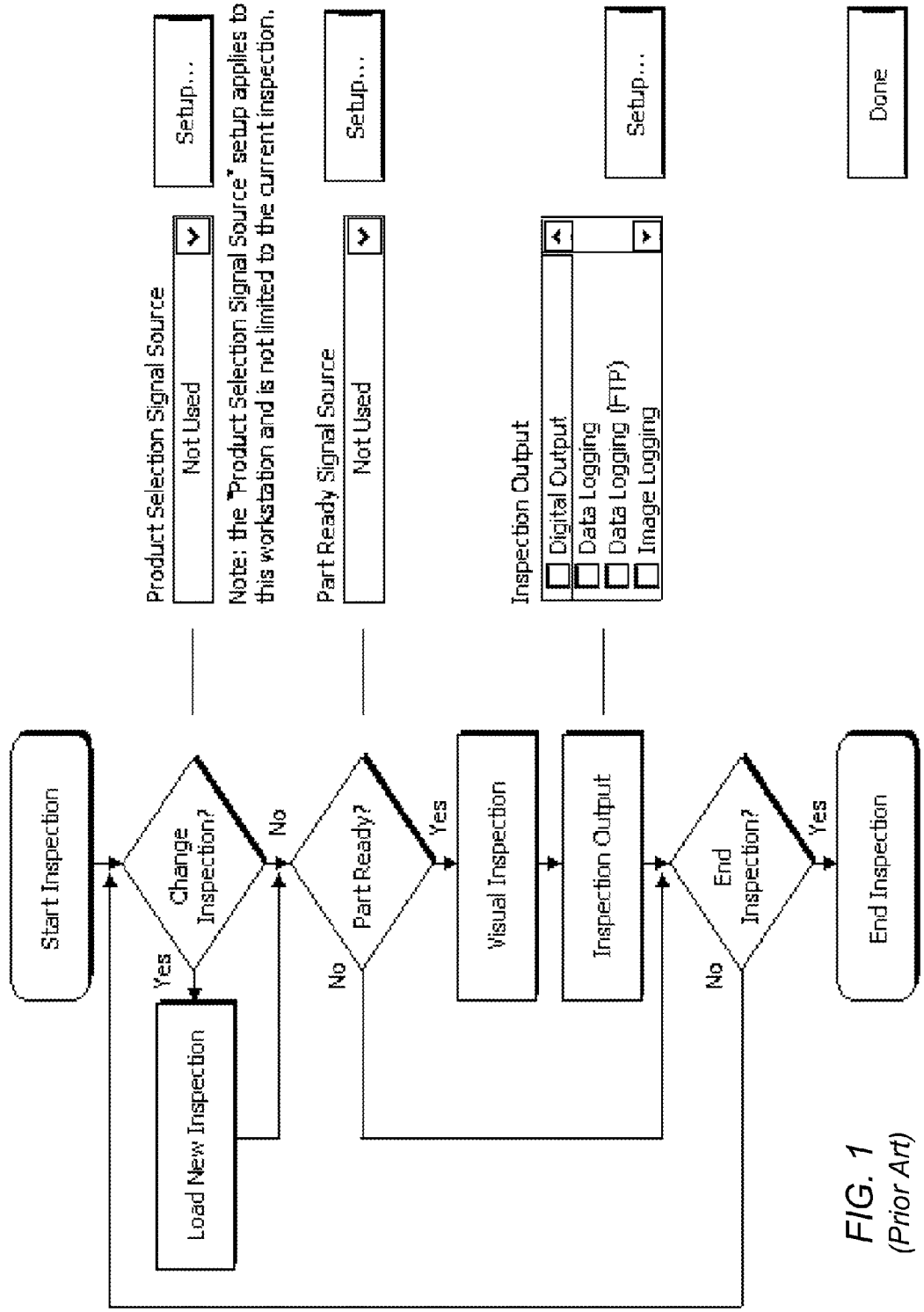
Figure 2A:
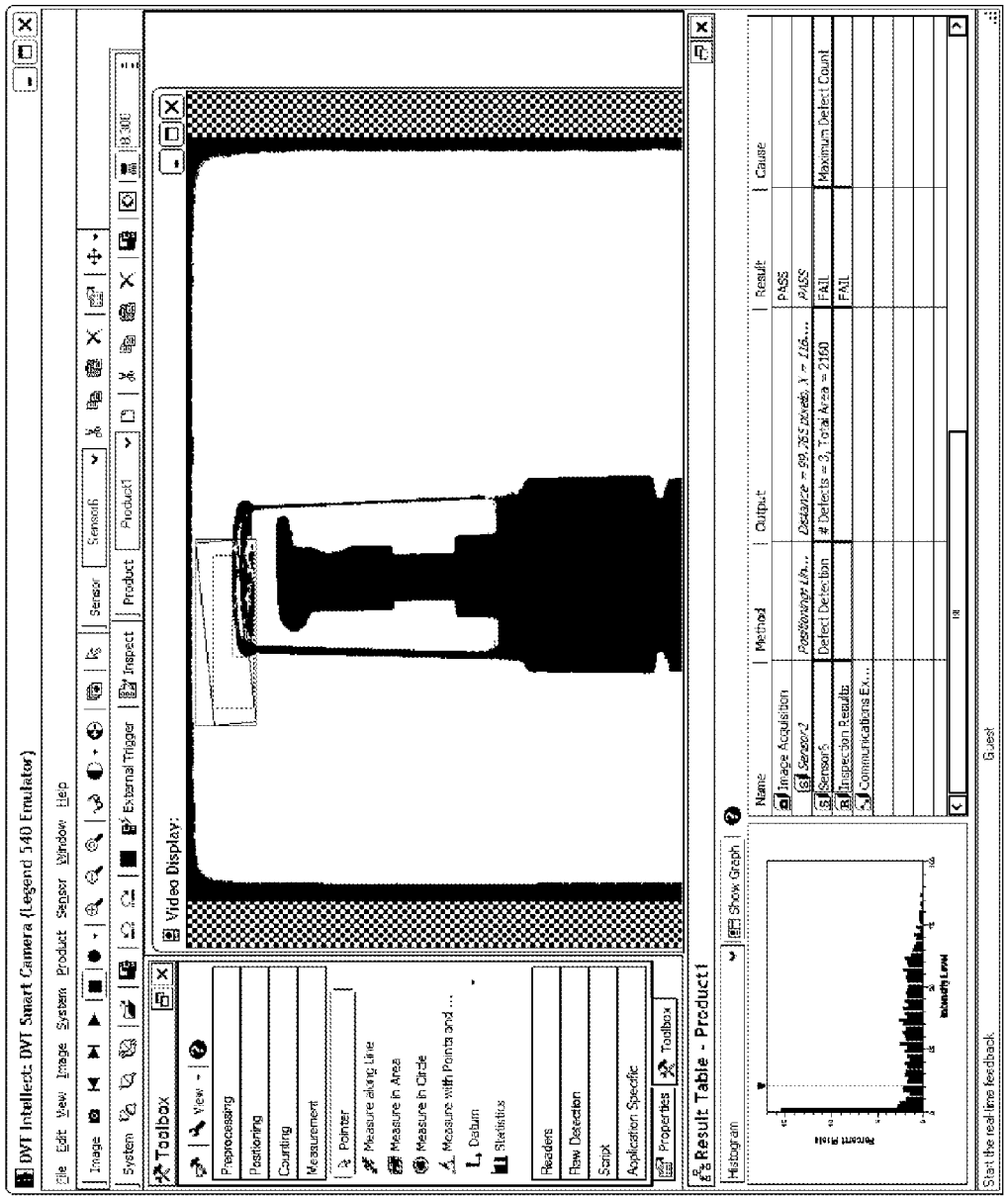
Figure 2B:
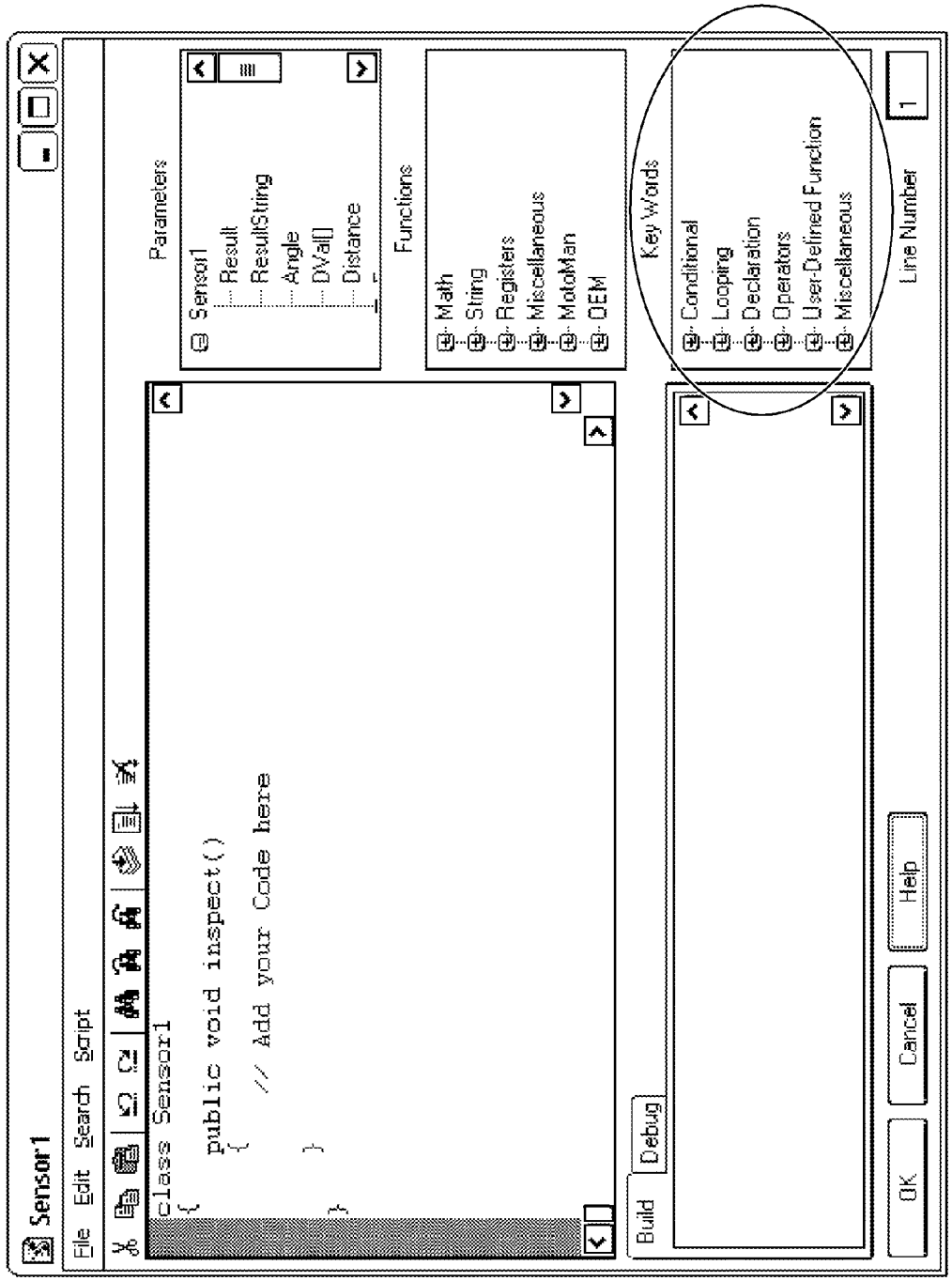
Figure 3A:
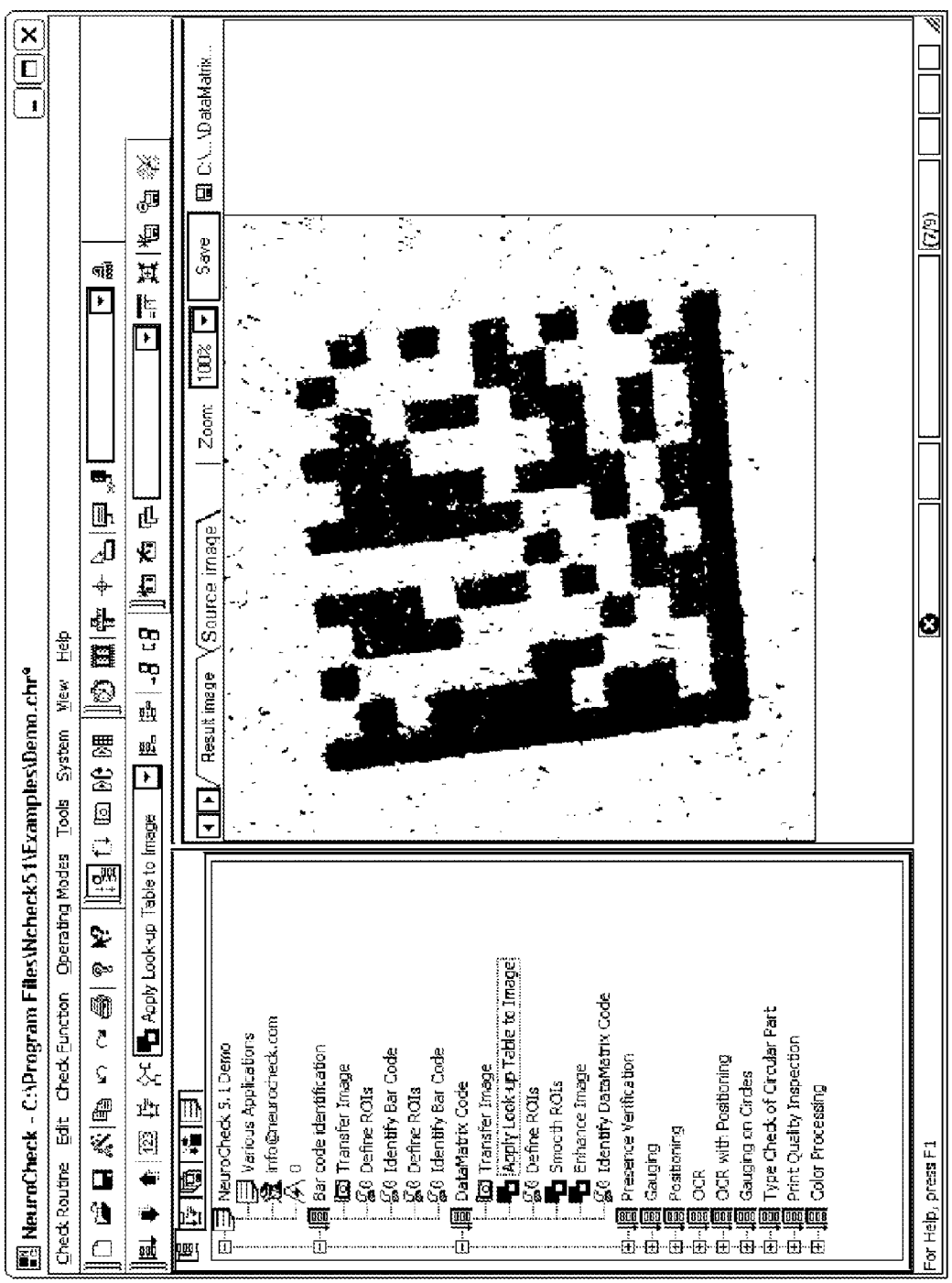
Figure 3C:
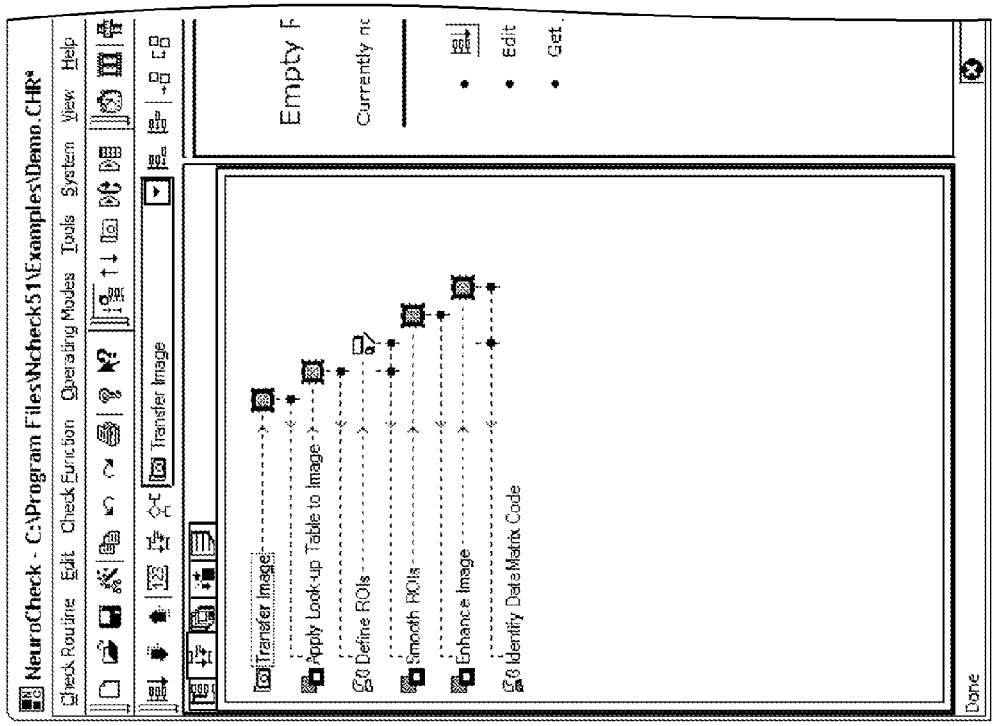
Figure 3B:
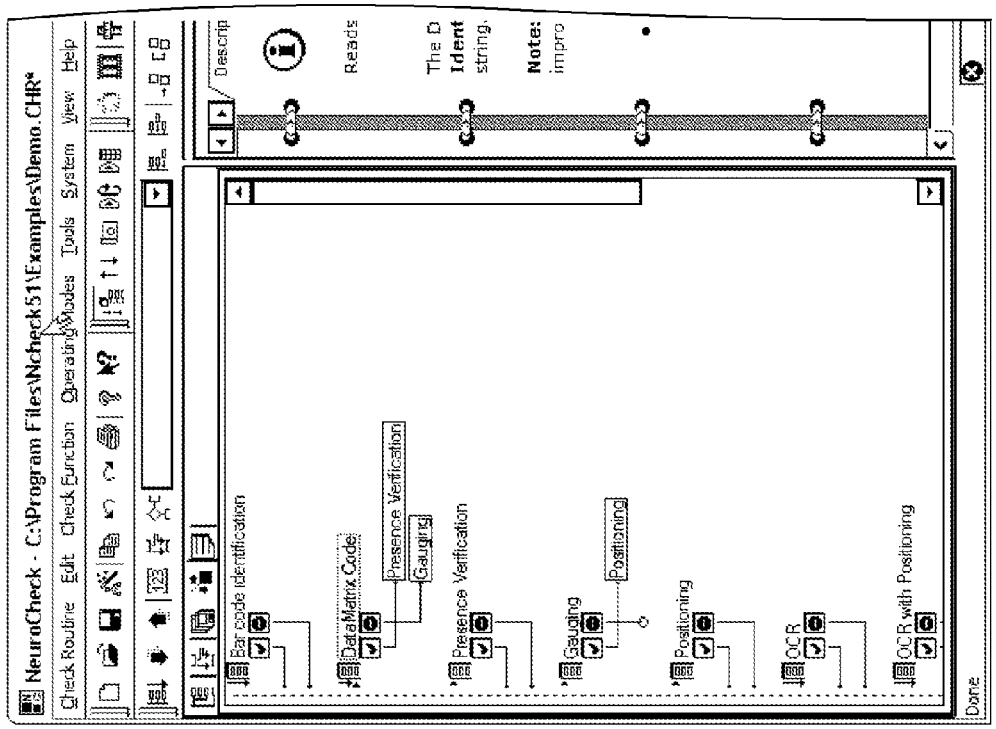
Figure 5:
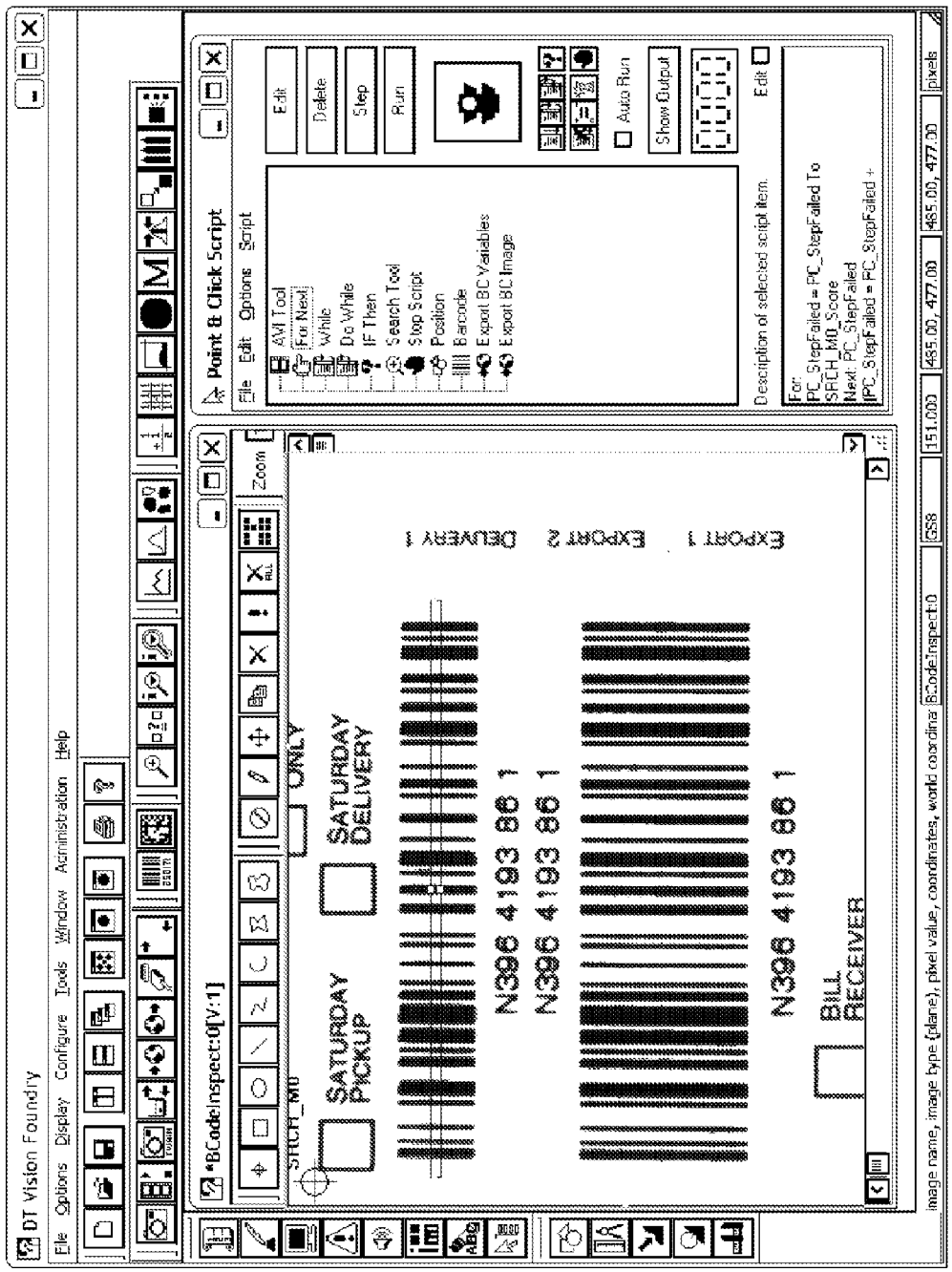

While the invention is susceptible to various modifications and alternative forms specific embodiments are shown by way of example in the drawings and are herein described in detail. It should be understood however, that drawings and detailed description thereto are not intended to limit the invention to the particular form disclosed, but on the contrary the invention is to cover all modifications, equivalents and alternative following within the spirit and scope of the present invention as defined by the appended claims.

DETAILED DESCRIPTION OF THE PREFERRED EMBODIMENT

Incorporation by Reference

U.S. provisional application Ser. No. 60/734,882 titled "Creating Machine Vision Inspections Using a State Diagram Representation" filed Nov. 09, 2005, whose inventors were Marc Marini and Nicolas Vazquez, is hereby incorporated by reference in its entirety as though fully and completely set forth herein.

U.S. Pat. No. 6,763,515 titled "System and Method for Automatically Generating a Graphical Program to Perform an Image Processing Algorithm", whose inventors are Nicolas Vazquez, Jeffrey L. Kodosky, Ram Kudukoli, Kevin L. Schultz, Dinesh Nair, and Christophe Caltagirone, and which issued on Jul. 13, 2004, is hereby incorporated by reference in its entirety as though fully and completely set forth herein.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium, that conveys signals such as electrical, electromagnetic, or digital signals.

Programmable Hardware Element—includes various types of programmable hardware, reconfigurable hardware, programmable logic, or field-programmable devices (FPDs), such as one or more FPGAs (Field Programmable Gate Arrays), or one or more PLDs (Programmable Logic Devices), such as one or more Simple PLDs (SPLDs) or one or more Complex PLDs (CPLDs), or other types of programmable hardware. A programmable hardware element may also be referred to as "reconfigurable logic"

Medium—includes one or more of a memory medium and/or a programmable hardware element; encompasses various types of mediums that can either store program instructions/data structures or can be configured with a hardware configuration program. For example, a medium that is "configured to perform a function or implement a software object" may be 1) a memory medium or carrier medium that stores program instructions, such that the program instructions are executable by a processor to perform the function or implement the software object; 2) a medium carrying signals that are involved with performing the function or implementing the software object; and/or 3) a programmable hardware element configured with a hardware configuration program to perform the function or implement the software object.

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

Graphical User Interface Element—an element of a graphical user interface, such as for providing input or displaying output.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

Figure 6A:
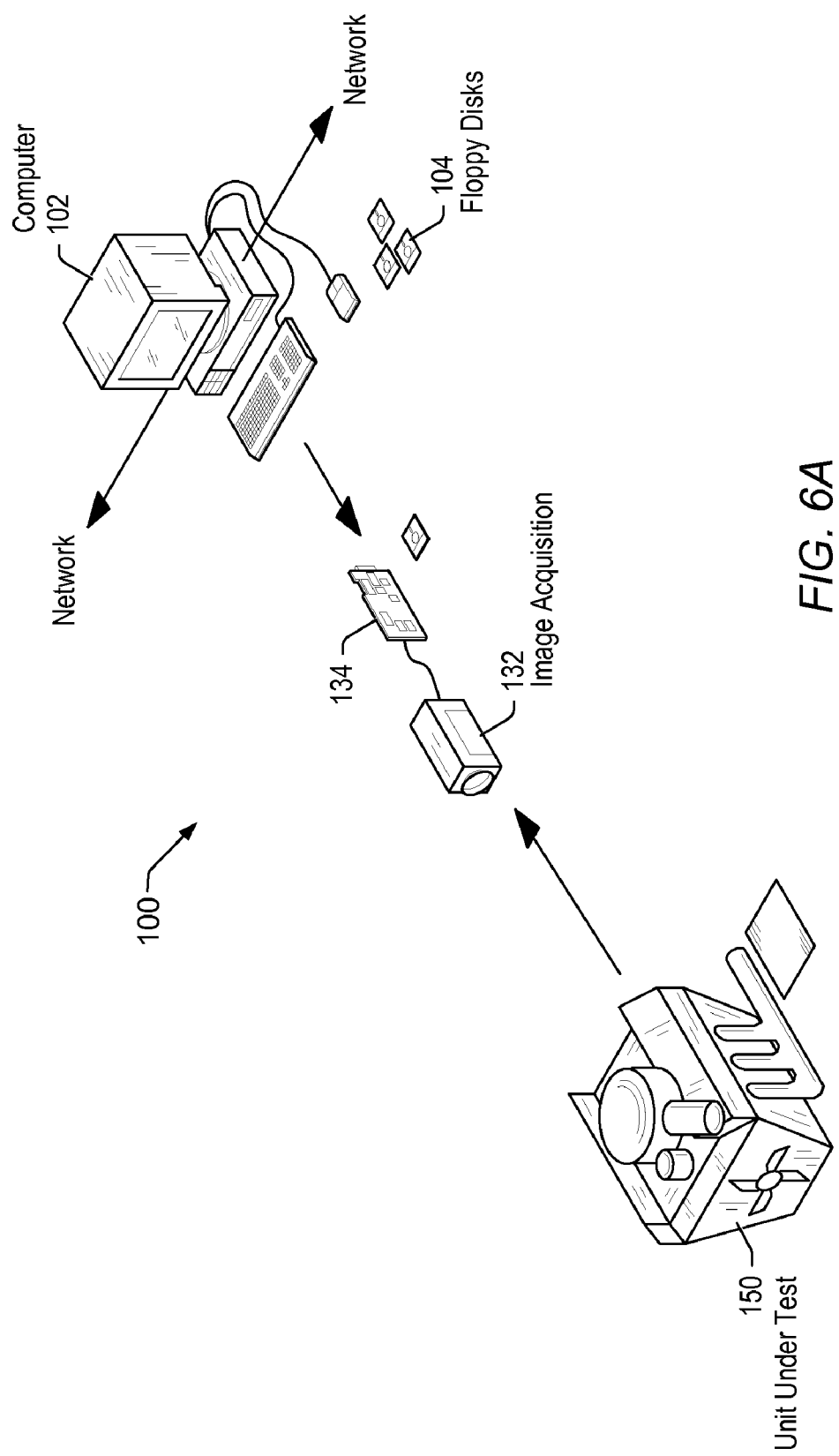
FIGS. 6A and 6B illustrate representative machine vision systems interfacing to a unit under test or part, respectively.
Figure 6B:
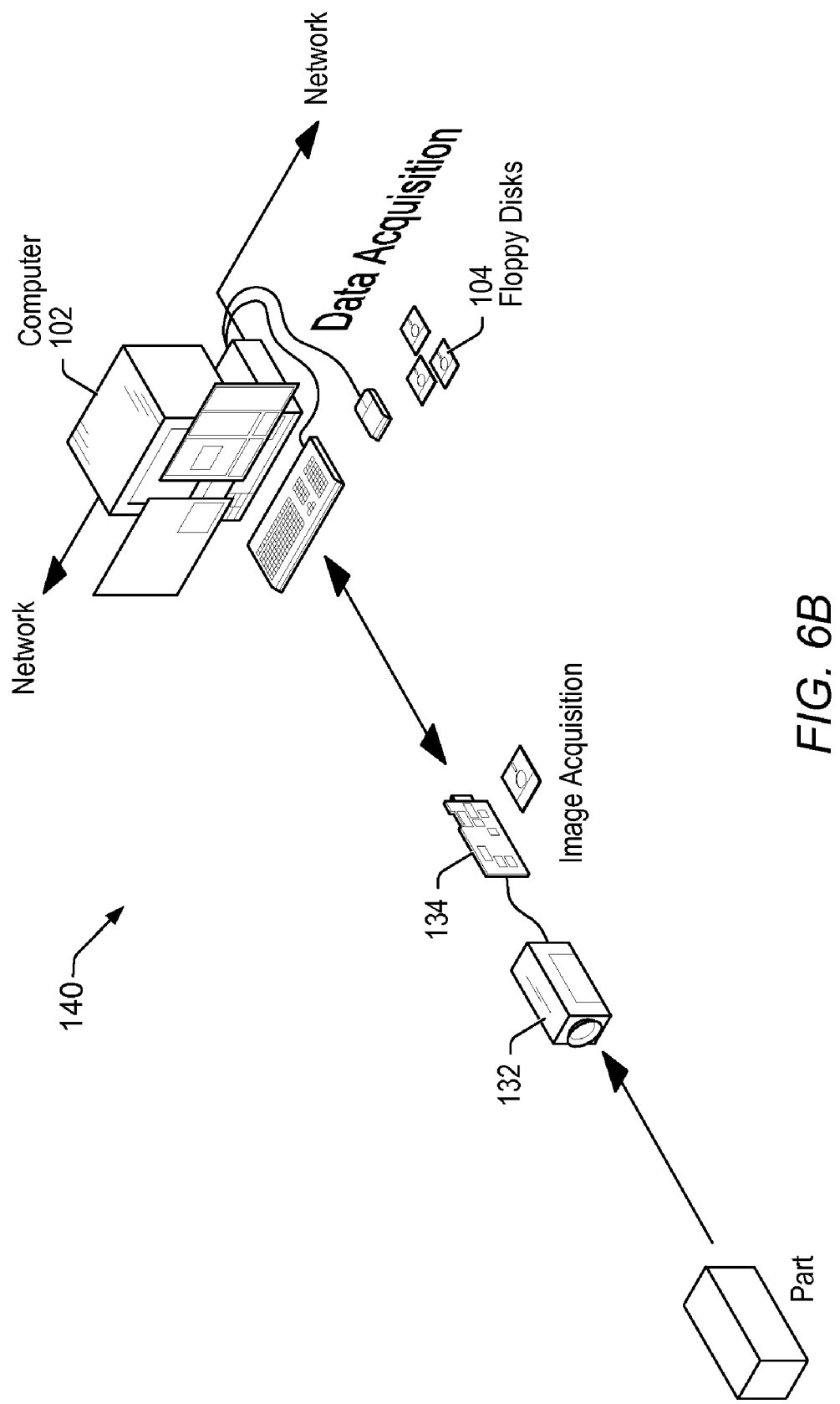

FIGS. 6A and 6B—Instrumentation and Industrial Automation Systems

FIGS. 6A and 6B illustrate exemplary systems which may be used to create and/or execute a machine vision system or process. Embodiments of the invention may of course also be used by other types of systems as desired.

FIG. 6A illustrates an exemplary machine vision system 100. The system 100 comprises a host computer 102 which may connect to a machine vision or image acquisition card 134, which in turn may couple to a camera 132. Thus the video device or camera 132 may be coupled to the computer 102 via the image acquisition card 134 provided by the computer 102.

The image acquisition card 134 may be typically plugged in to an I/O slot in the computer 102, such as a PCI bus slot, a PC Card slot, a PCI Express bus slot, or an ISA, EISA or MicroChannel bus slot provided by the computer 102. However, this card 134 is shown external to computer 102 for illustrative purposes.

The host computer 102 may comprise a CPU, a display screen, memory, and one or more input devices such as a mouse or keyboard as shown. The camera 132 may operate to capture images (or inspect) a unit under test (UUT) 150. The host computer 102 may store computer programs or components for creating a control flow diagram, and in one embodiment a state transition diagram, to control the machine vision process. The host computer 102 may also execute the machine vision process after it has been specified as described herein. It is noted that the host computer 102 is exemplary, and various types of processing systems may be used, as desired.

FIG. 6B illustrates an exemplary machine system 140 similar to FIG. 6A, where the camera 132 acquires images of a part, such as on an assembly line.

Referring again to FIGS. 6A and 6B, the computer system 102 preferably includes a memory medium on which one or more computer programs or software components according to the present invention are stored. The term "memory medium" is intended to include an installation medium, e.g., a CD-ROM, floppy disks 104, or tape device, a computer system memory such as DRAM, SRAM, EDO RAM, Rambus RAM, etc., a non-volatile memory such as a magnetic media, e.g., a hard drive, or optical storage, network storage devices, and other types of computer memory. The memory medium may comprise other types of memory as well, or combinations thereof.

Figure 7:
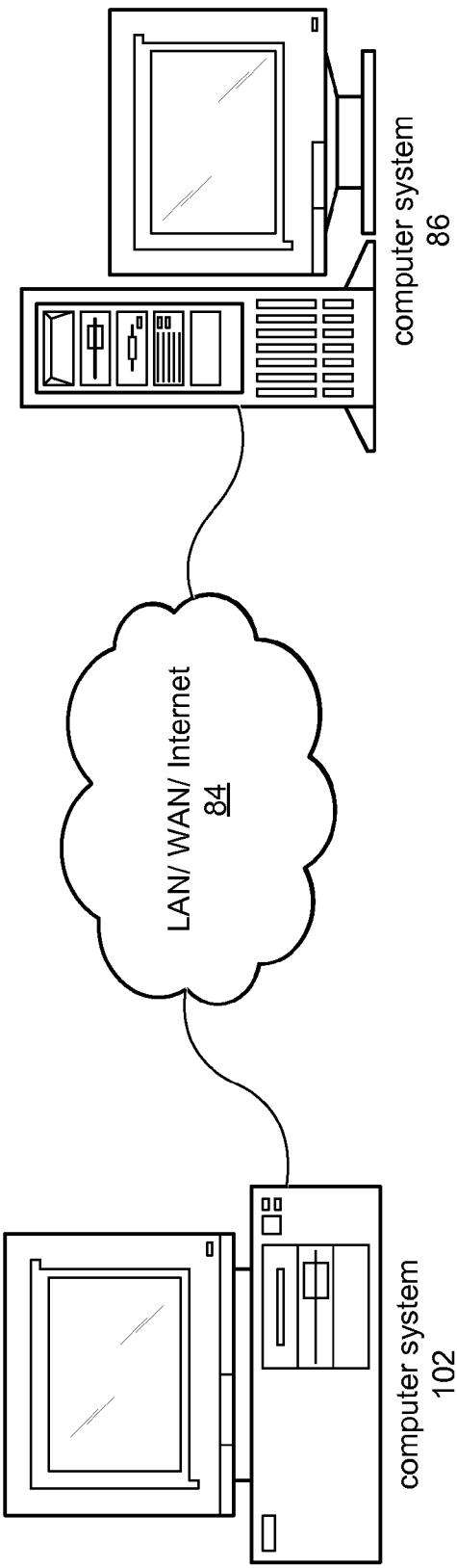
FIG. 7 illustrates a computer system connected through a network to a second computer system.

In addition, the memory medium may be located in a first computer in which the programs are executed, or may be located in a second different computer which connects to the first computer over a network 84, such as the Internet, as shown in FIG. 7, e.g., computer 102 coupled to a second computer 86, e.g., a server computer. In the latter instance, the second computer 86 provides the program instructions to the first computer 102 for execution. Also, the computer system 102 may take various forms, including a personal computer system, mainframe computer system, workstation, network appliance, Internet appliance, personal digital assistant (PDA), television system, smart camera, vision sensor, or other device. In general, the term "computer system" can be broadly defined to encompass any device having at least one processor which executes instructions from a memory medium.

Figure 8:
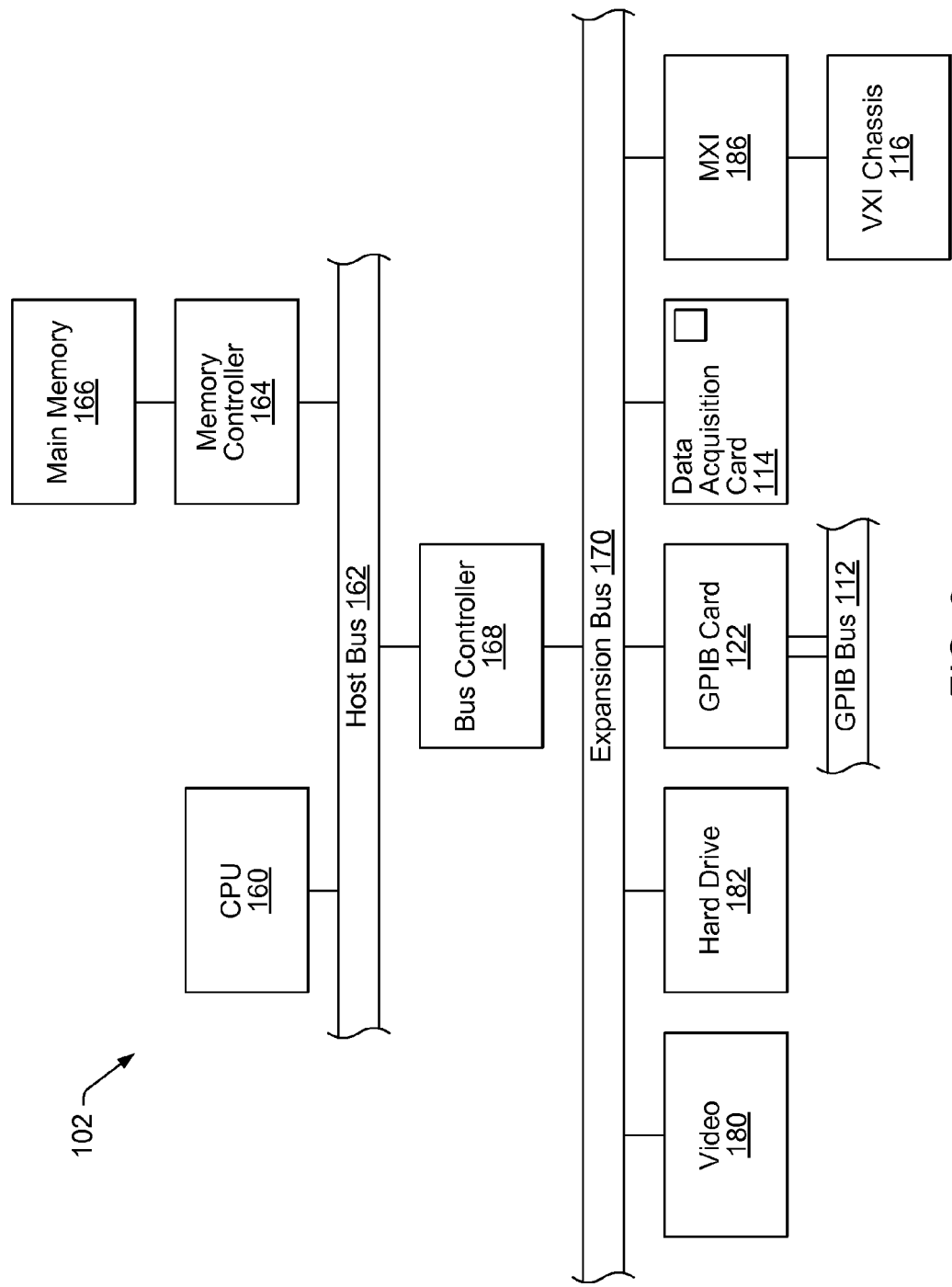
FIG. 8 is an exemplary block diagram of the computer system of FIGS. 6A, 6B and 7.

FIG. 8—Computer System Block Diagram

FIG. 8 is a block diagram of the computer system illustrated in FIGS. 6A, 6B, and 7. It is noted that any type of computer system configuration or architecture can be used as desired, and FIG. 8 illustrates a representative PC embodiment. It is also noted that the computer system may be a general purpose computer system as shown in FIGS. 6A and 6B, a computer implemented on a VXI card installed in a VXI chassis, a computer implemented on a PXI card installed in a PXI chassis, an embedded system, or other types of embodiments. The elements of a computer not necessary to understand the present invention have been omitted for simplicity.

The computer 102 may include at least one central processing unit or CPU 160 which is coupled to a processor or host bus 162. The CPU 160 may be any of various types, including an x86 processor, e.g., a Pentium class, a PowerPC processor, a CPU from the SPARC family of RISC processors, as well as others. Main memory 166 is coupled to the host bus 162 by means of memory controller 164.

The main memory 166 may store computer programs according to the present invention. The main memory 166 may also store operating system software as well as other software for operation of the computer system, as well known to those skilled in the art. The computer programs of the present invention will be discussed in more detail below. Additionally, or alternatively, the main computer may include other processing elements/systems. For example, the computer may include one or more programmable hardware elements, e.g., including a field programmable gate array (FPGA) and/or include DSP capabilities.

The host bus 162 is coupled to an expansion or input/output bus 170 by means of a bus controller 168 or bus bridge logic.

The expansion bus 170 is preferably the PCI (Peripheral Component Interconnect) expansion bus, although other bus types can be used. The expansion bus 170 includes slots for various devices such as the data acquisition board 114 (of FIG. 7A), a GPIB interface card 122 which provides a GPIB bus interface to the GPIB instrument 112 (of FIG. 7A), and a VXI or MXI bus card 186 coupled to the VXI chassis 116 for receiving VXI instruments. The computer 102 may further comprise a video display subsystem 180 and hard drive 182 coupled to the expansion bus 170.

Figure 9:
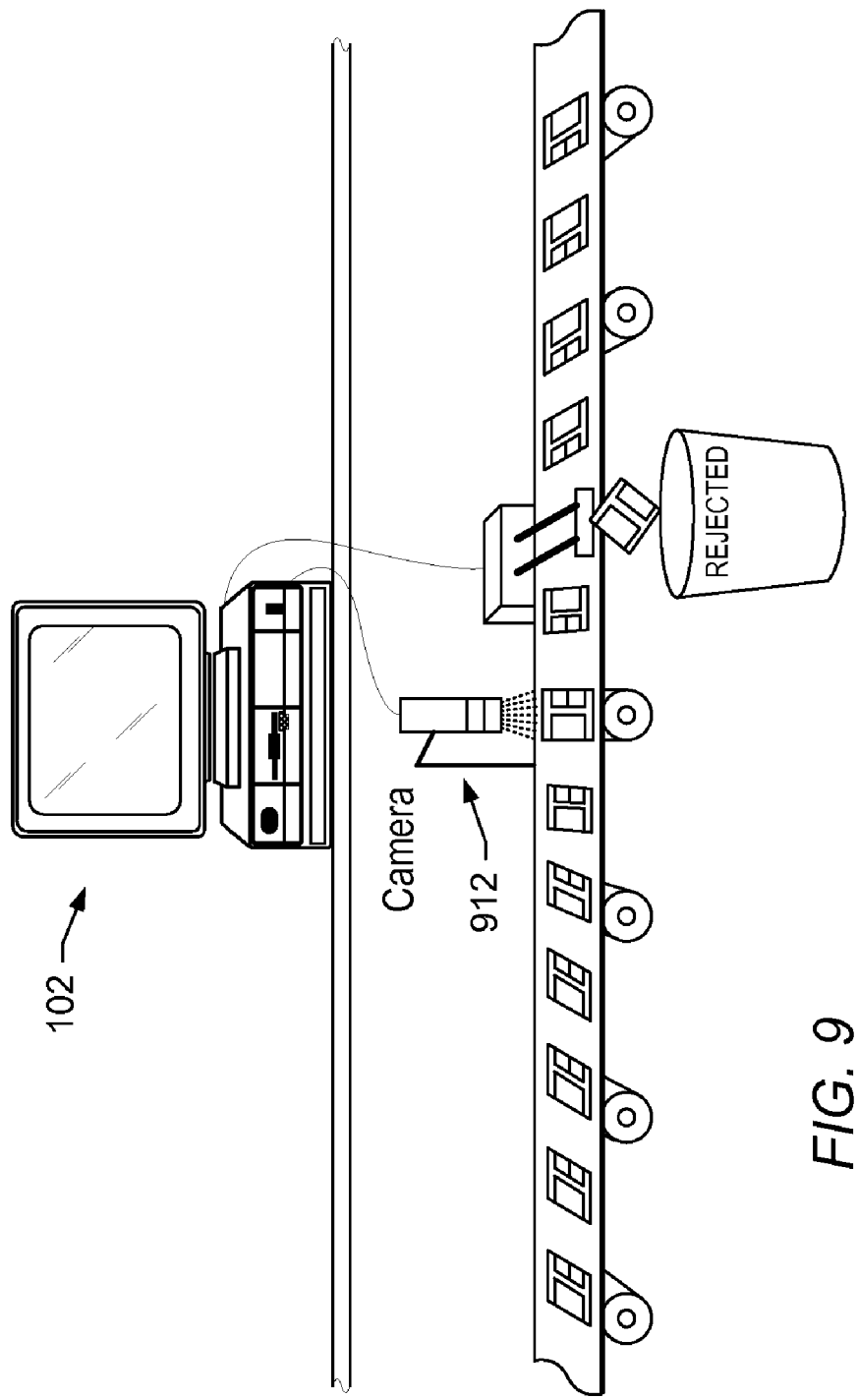
FIG. 9 illustrates a system for implementing a machine vision development environment, according to one embodiment of the invention.

FIG. 9—A Machine Vision System

FIG. 9 illustrates one embodiment of a machine vision system. As FIG. 9 shows, the exemplary machine vision system may include a host computer 102 and a video source 512. The video source 912 may produce an analog or digital video signal that may include a sequence of video frames, or other data desired to be acquired. The analog or digital video signal may be provided to the host computer 102 for storage and/or processing.

In machine visions such as that shown in FIG. 9, a common task may be to inspect an object on an assembly line. This task may include acquiring an image of the object and then performing some machine vision (image) processing on the acquired image to determine characteristics of the object. As one example, this task may include recognizing the presence or absence of particular forms or objects, such as Blobs (Binary Large Objects) in a video frame.

For example, a machine vision system may be deployed in a manufacturing plant to inspect circuit boards for quality control. The system may specifically look for proper placement and orientation of components, such as computer chips. This task may involve pattern matching, e.g., the system may process image information, looking for an object or Blob that matches one of a set of candidate forms. In another embodiment, image information may be sampled in a certain region of the object.

Machine vision systems such as those described above may be required to process the image data in or near real-time. As described above, it may be desirable to provide an improved method for creating a desired machine vision program. In some embodiments, the machine vision system may be specified by user creation of a control flow diagram. The control flow diagram may be a state transition diagram, i.e., a state diagram. The state diagram may specify a machine vision program to control the machine vision system.

State Transition Diagram

State transition diagrams, i.e., state diagrams, may be used to represent a series of finite states in a system. State diagrams may start at an initial state and end at one or more final states with a number of intervening states. Two states may be linked by a transition, wherein the transition may define conditions under which the transition may occur.

As used herein, a state may denote the current condition or stage in a process, e.g., a visual inspection process. In some embodiments, visual inspection tasks may be associated with a state. In some embodiments, a state may include associated steps necessary in the implementation of a machine vision system such as digital or analog input/output, industrial communication (TCP, Modbus, etc.), decision making means, and/or any other functions necessary to implement a complete machine vision system, as desired. Transitions may control the execution flow of the visual inspection represented in the state diagram. A transition may include a condition whereupon one state may change to (transition to) another state. In some embodiments, the transition condition may be based on results produced by the visual inspection steps associated with the state. For example, a transition may occur after the number of parts or objects found in, for example, a tray is greater than a specified number of objects.

In some embodiments, the state diagram may have a single initial state and one or more final states. The state diagram may have a linear progression of states or may branch or jump between states. The state diagram may have any of various forms, including those shown and described herein, as well as other more types of state diagrams. Transitions may originate from a first state, and indicate a transition to a destination state, where the destination state may be a different state or the state itself. Transitions may be specified between any two states present in the state diagram.

In some embodiments, there may be multiple transitions from a state; in which case, each transition may have an associated condition that must be satisfied for the transition to occur and/or a priority may be set programmatically or automatically, or by the user, to each of the respective transitions. Where priorities are specified, the machine vision program may then use the priorities set by the system or user such that the transitions from the state are evaluated in the specified priority order. Each state may also have at least one transition, e.g., a default transition, originating from the state. The default transition may always be met once any other conditions have been checked, and it may have the lowest priority. For example, upon failing to meet conditions for other transitions, the default transition may specify a transition to a destination state, such as itself or another state.

Accordingly, the execution of the state diagram may start at an initial state and end at one or more final states. In embodiments described herein, in each state, associated visual inspection steps may be executed as specified by the current state and associated transitions may be evaluated in the order of the assigned priority. Upon meeting the criteria of a transition, the current state may be changed to the destination state. In some cases, no transition condition may be met, in which case the current state may be changed to the destination state specified by the default transition. In some embodiments, the destination state and the current state may be the same states. The execution of visual inspection steps and evaluation of transitions may occur until one of the final states is reached. In some embodiments, the user or system may insert a breakpoint or halt the execution of the state diagram at any point in the state diagram.

Machine Vision Program

As stated hereinabove, the state diagram may specify (or implement) a machine vision program to control the machine vision system. In some embodiments, the machine vision program may acquire image(s), perform operations on the image(s), and store information regarding the image(s) for future use. In some embodiments, the image may correspond to an object under inspection and the stored information may relate to conditions or qualities of the object, e.g., whether the object is within quality assessment tolerances, the product number of the object, etc. In some embodiments, the inspection may repeat until a condition is met. Inspections may also occur only upon meeting a given condition. For example, the inspection may occur when the object under inspection is in the correct position, when the object arrives into the current view of the video source, etc. In some embodiments, the results of a previous inspection may be incorporated into subsequent inspections as iteration or switch conditions or for other purposes. For example, the machine vision program may perform a preliminary rough inspection, such as an overall hue assessment, and upon positive results from that inspection, perform a more rigorous inspection of the object under inspection. In some embodiments, the machine vision system may continuously acquire and analyze an image until an object is detected, and upon detection, the machine vision system may perform a sequence of visual inspection steps, which may be specified by the machine vision program, for example, to verify the image completeness, detection of new elements, etc. Such embodiments may apply to surveillance cameras or quality assessment of a series of objects on a conveyer belt as shown in FIG. 9.

In some embodiments, the machine vision system may be operable to read a product identification (ID) number or symbol from an item, or otherwise determine the identity of the item. For example, upon reading the ID, an appropriate visual inspection based on the ID may be loaded into the machine vision program. In some embodiments, the machine vision system may acquire an image of parts disposed in a tray and repeat inspection for each of the parts in the tray. In this embodiment, the machine vision program may acquire an image, locate all the parts in the image, and run sub-inspections on each of the located parts. Note that the sub-inspections may themselves be specified as state diagrams, e.g., in a state diagram editor. In other words, in some embodiments, various ones of the states and/or transitions in the state diagram may represent sub-inspections which may be state diagrams.

In some embodiments, the image may be acquired from a video source, such as camera 912, or from some other sources, such as a storage device or external systems, e.g., coupled to the machine vision system via a network as indicated by FIG. 6. In some embodiments, the video source may acquire images from objects traveling along a conveyer belt as in the system of FIG. 9. In some embodiments, the machine vision system may assign a pass or fail to an object on the conveyer belt, and objects that fail may be marked for rejection or disposed of in an automatic manner, as indicated in FIG. 9.

Figure 10:
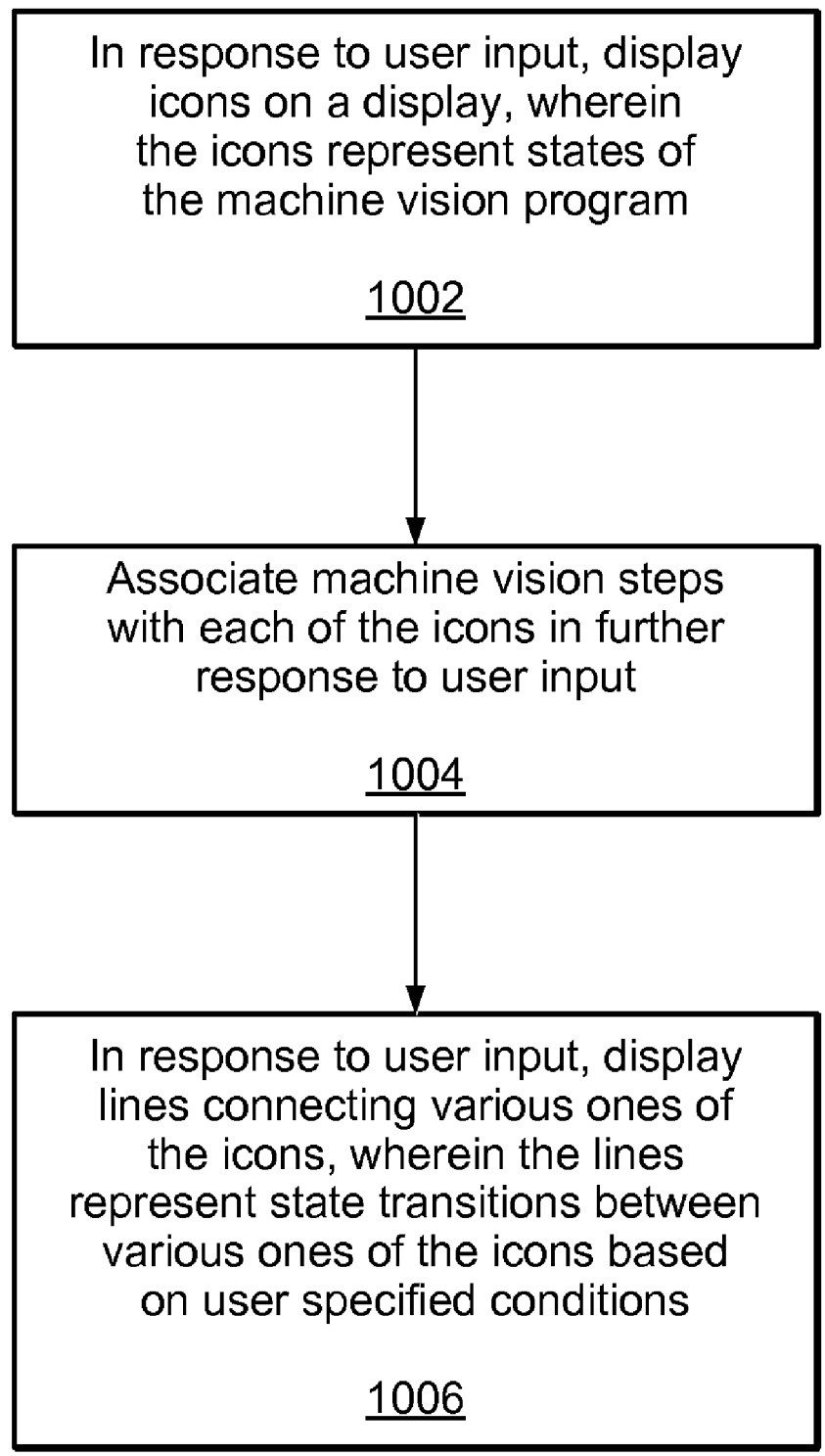
FIG. 10 is a flowchart diagram illustrating a method for creating a machine vision program, according to one embodiment of the invention.

FIG. 10—Method for Creating a Machine Vision Program

Figure 11C:
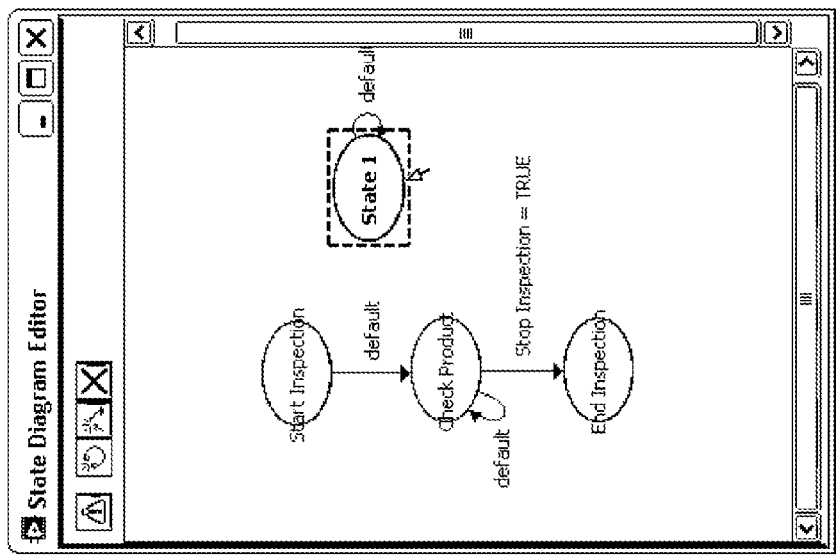
FIG. 11 illustrates a series of steps within a Graphical User Interface (GUI) for creating a new state within a machine vision program, according to one embodiment of the invention.
Figure 11B:
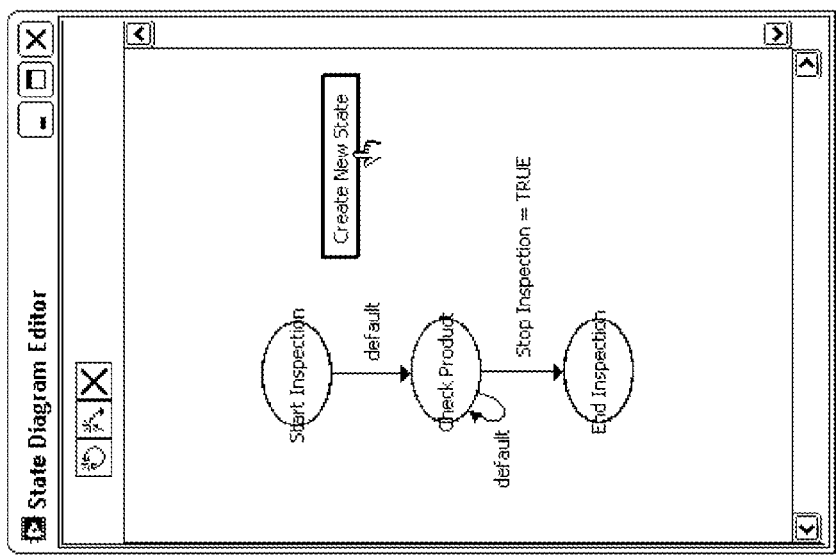
Figure 11A:
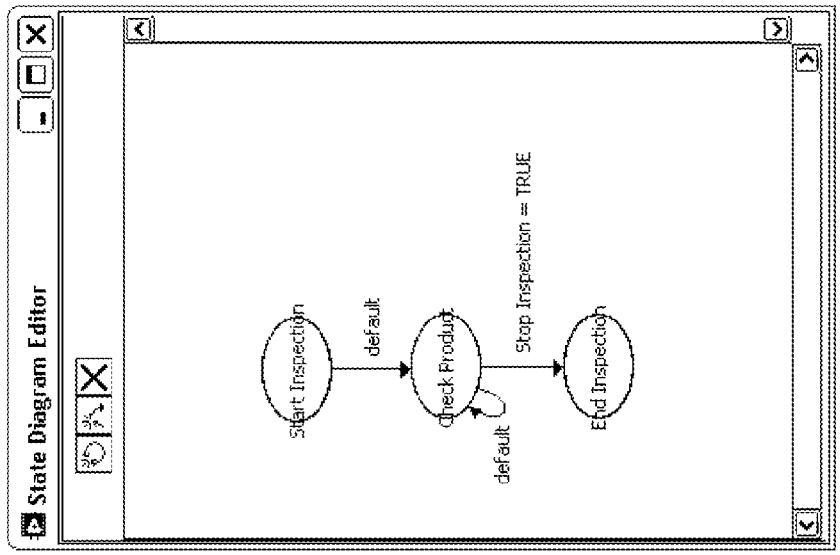

The flow chart in FIG. 10 provides an exemplary method for creating a machine vision program, e.g., a method for specifying a state diagram that describes or characterizes (or implements) the machine vision program. It should be noted that in various embodiments, some of the method elements may be performed concurrently, in a different order than shown, or omitted. Additional method elements may also be performed. The method may operate as follows:

In 1002, in response to user input, a plurality of icons representing states of a machine vision program may be displayed. For example, in one embodiment, a user may provide input to a graphical user interface (GUI) specifying or selecting the states, e.g., via menus, palettes, etc. Corresponding icons for the specified states may then be displayed, e.g., on a computer monitor or other display device. In some embodiments, one or more of the icons may correspond to associated operations or functions of the states of the machine vision program or process, e.g., Load Inspection, Locate Object, Measure Feature, Read Barcode, Read Digital Input, etc. These operations or functions may be applied to signals generated from video source 912. FIG. 11 illustrates a specific example of a user interacting with a GUI to create a new state within a machine vision program. As FIG. 11 shows, a user may add a new state using a menu as in FIG. 11B to modify the state diagram of FIG. 11A, resulting in a new state in the state diagram, illustrated in FIG. 11C.

In some embodiments, a second plurality of icons which correspond to a plurality of possible machine vision sets may be displayed. In 1004, the user may also select a sequence of one or more steps or functions to be performed upon reaching the specified state e.g. from the second plurality of icons. In some embodiments, the user selecting the sequence of one or more steps or functions may include graphically associating icons representing the steps or functions with the icons representing states described above (among others). In one embodiment, these steps or functions may include visual inspection steps. In other words, in 1004 the user may associate a machine vision or inspection routine with a respective state, e.g., such that the routine may execute upon entering the respective state. In one embodiment, the one or more steps or functions may operate to transition the current state to the next state. Thus, the user may specify steps or functions to be performed in between states.

Figure 12:
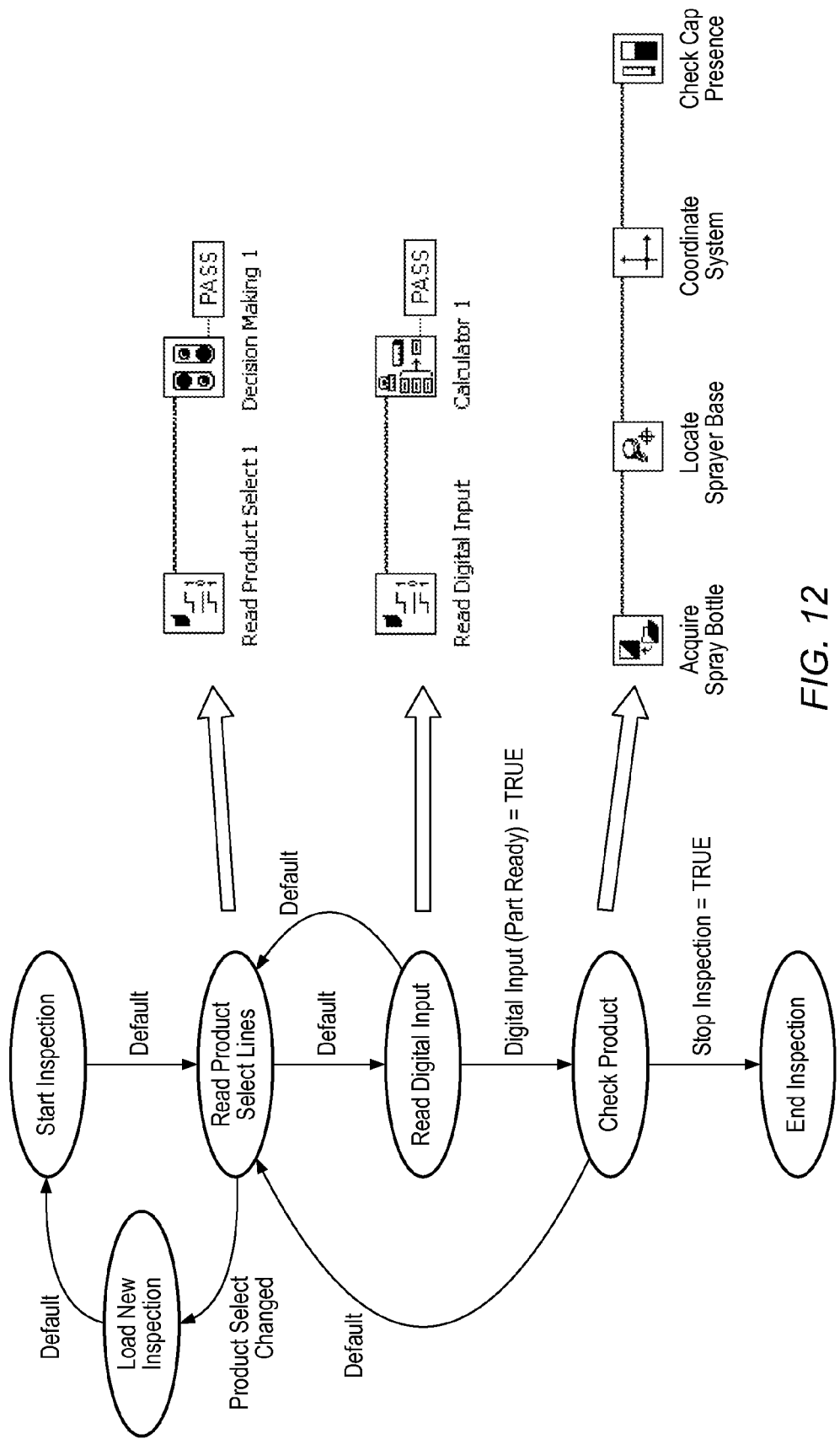
FIG. 12 illustrates a series of states and transitions in a machine vision program with associated visual inspection steps, according to one embodiment of the invention.

In some embodiments, one or more of the states or transitions may represent other diagrams, e.g., state diagrams. For example, the user may associate a machine vision or inspection routine with the respective state by specifying another diagram. Thus, in some embodiments, various state icons or transition lines may themselves represent or include other diagrams or processes. In some embodiments, associating the machine vision steps may include associating one or more of a histogram step, a threshold step, a scan step, a part ready step, a read digital input step, a load inspection step, a check product step, a start inspection step, an inspect object step, a coordinate system step, a stop inspection step, and/or a user defined step (e.g., defined interactively by the user), among other steps. FIG. 12 discloses a specific example of a machine vision program comprised of states with associated visual inspection steps. For example, as FIG. 12 shows, the Check Product state may have associated visual inspection steps Acquire Spray Bottle, Locate Sprayer Base, Coordinate System, and Check Cap Presence.

In some embodiments, these associated vision inspection steps may be generated automatically based upon the user's interaction with an acquired image, where, for example, the user's sequence of processing steps are recorded to create the inspection routine. Details of this embodiment are disclosed in the incorporated reference U.S. Pat. No. 6,763,515. In some embodiments, the icons representing the states may change their appearance, e.g. changing the icons, adding overlaid images, changing colors, etc., based on the current visual inspection step being performed, transition values, or item under inspection. In further embodiments, the user may also specify these appearance changes, e.g., via the GUI.

Figure 13C:
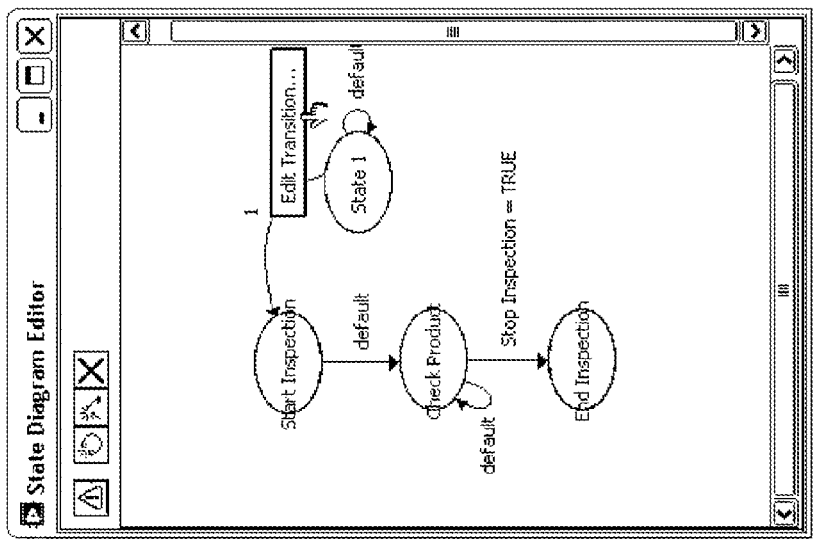
FIG. 13 illustrates a series of steps within a GUI for creating and editing a transition between two states in a machine vision program, according to one embodiment of the invention.
Figure 13B:
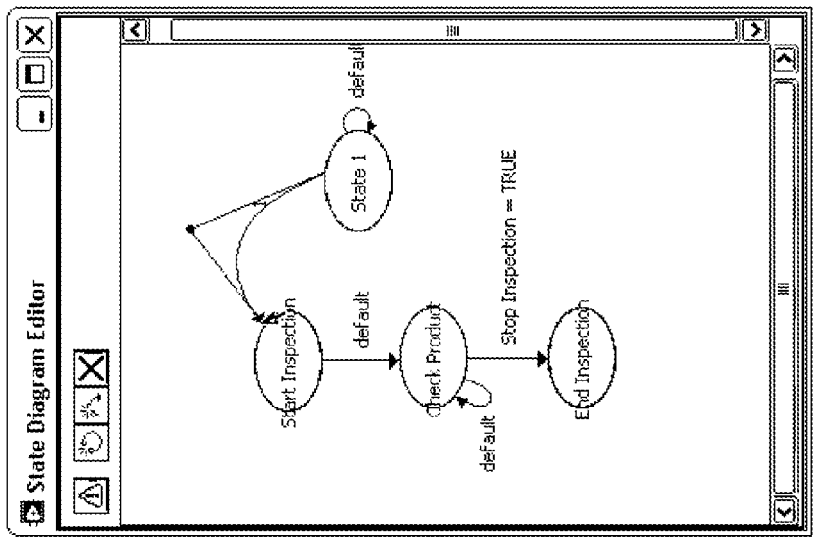
Figure 13A:
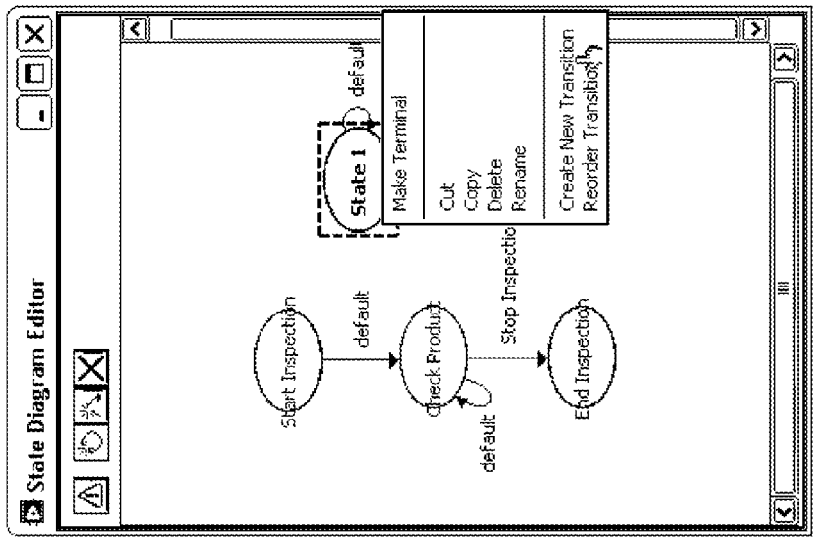

In 1006, the user may connect the icons using an input method, e.g., a mouse, a keyboard, voice activation, touch screen, etc. The icons may be connected graphically via lines on the display of computer system 102. These lines may specify and represent transitions between states. FIG. 13 illustrates a specific example of a user interacting with a machine vision program (FIG. 13A) and creating a transition between a first state, e.g., State 1, and another state, e.g., Start Inspection (FIG. 13B). In some embodiments, the user may edit the transition (FIG. 13C) using a transition editor. In further embodiments, the user may specify respective conditions for one or more of the transitions, i.e., transition criteria. In particular, in one embodiment, the transitions between states may not be performed until the conditions are met. Conditions may include whether the objects under inspection is loaded or detected, dimension of the object under inspection, color of the object under inspection, intensity of the object under inspection, text of the object under inspection, barcode of the object under inspection, the location of the object under inspection, minimum values associated with the object, maximum values associated with the object, a range of values associated with the object, and/or whether the object passes inspection, among others.

The method may further include executing the machine vision program. During execution, the machine vision program may perform the machine vision steps based on the user-specified conditions described above.

Figure 14:
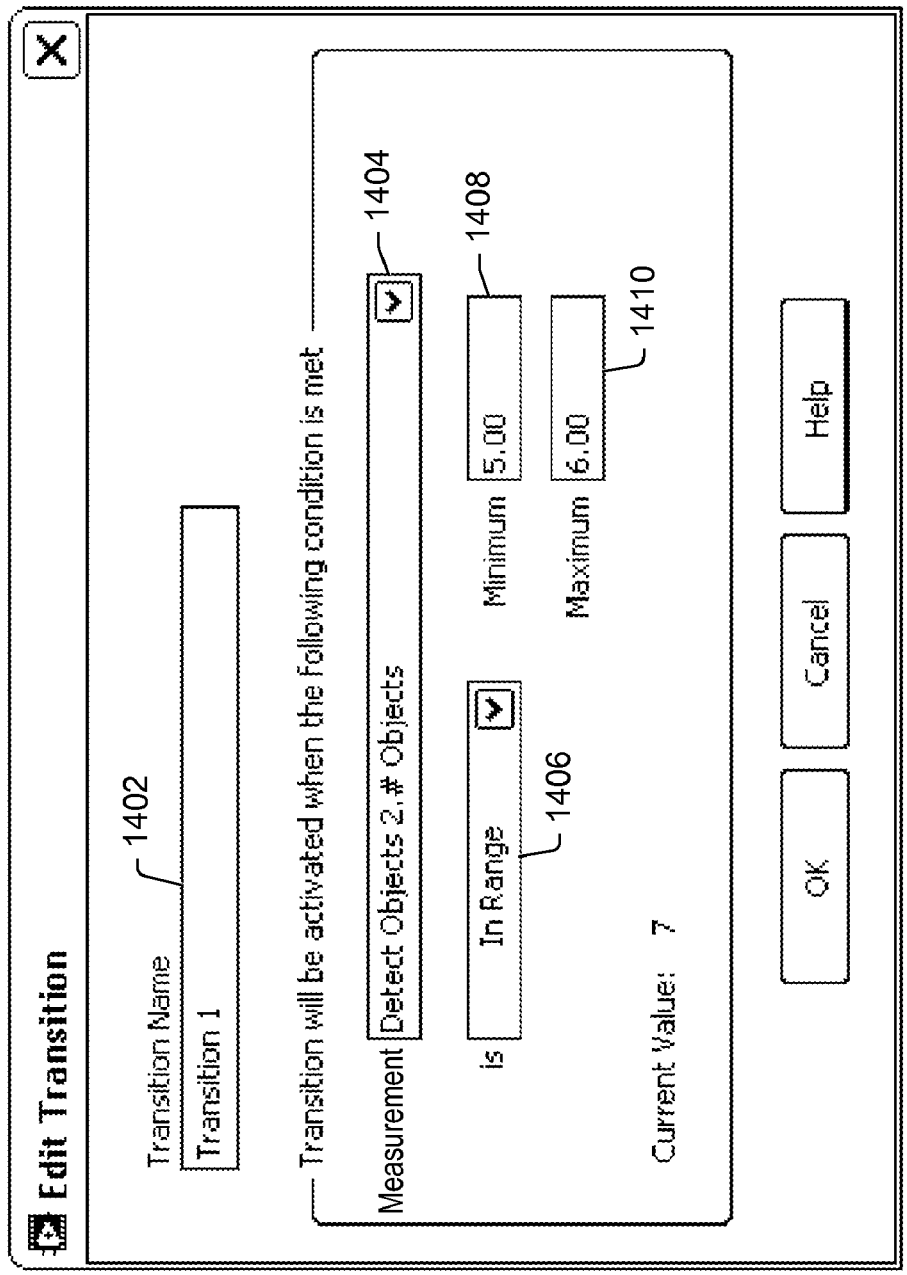
FIG. 14 illustrates a transition editor for editing a transition between two states in a machine vision program, according to one embodiment of the invention.

FIG. 14 discloses an embodiment of a transition editor. The transition editor may include a graphical user interface (GUI) that may be used by a user to specify conditions for transitions between states, e.g., from the state to itself or to other states. In FIG. 14, the Transition Name 1402, the measurement 1404, the specification of the measurement 1406, and the Minimum 1408 and Maximum 1410 of the measurement may be defined for the newly created transition. As described above, multiple transitions may include a default transition and one or more other transitions to states and each respective transition condition may be applied with respect to a specified priority order. In some embodiments, the conditions may include a specific measurement value, a range of measurement values, a specified quality of the object (e.g., color assessment), etc.

Figure 15:
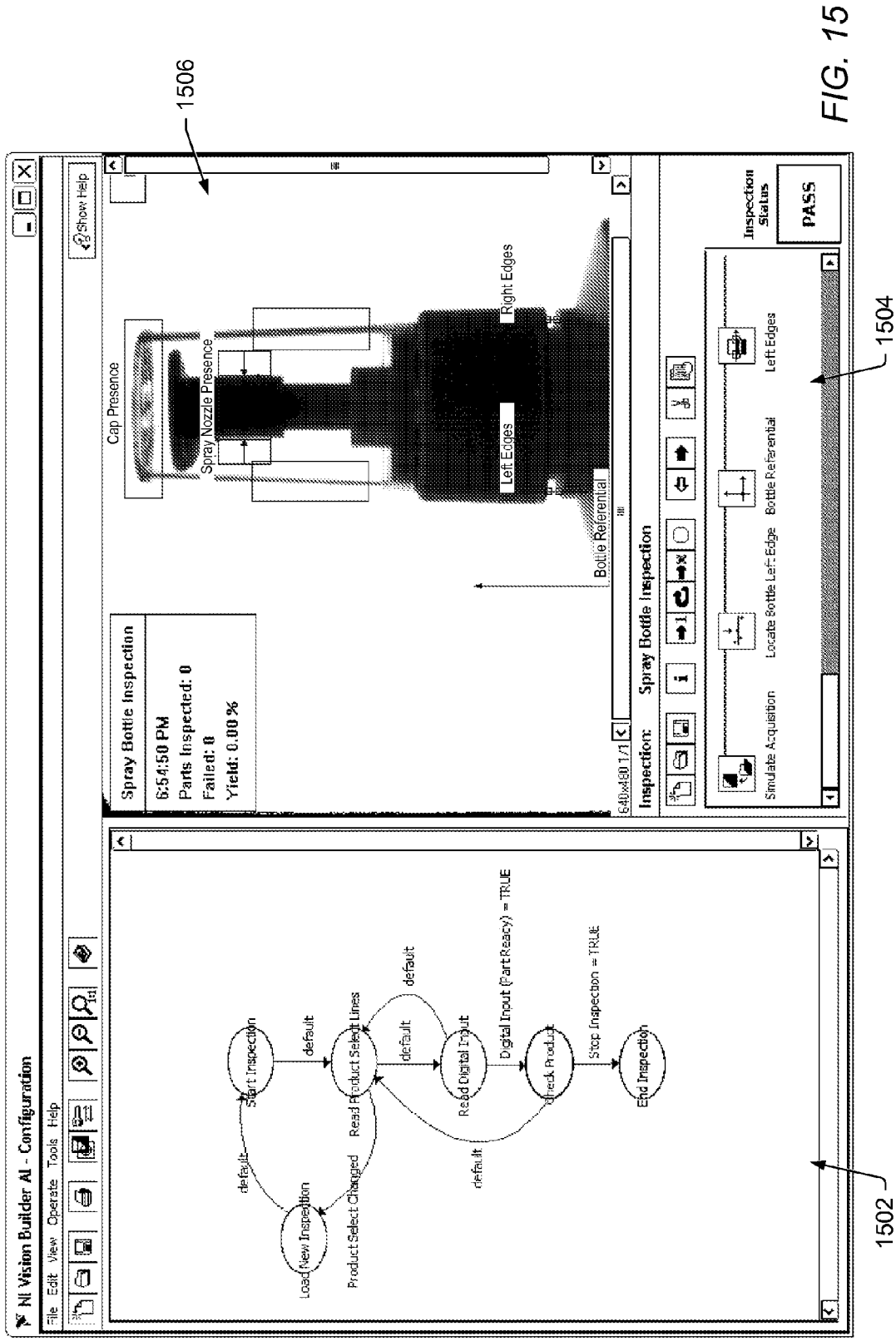
FIG. 15 illustrates the operation of a machine vision program, according to one embodiment of the invention.

FIG. 15 illustrates a specific example of an object under inspection with a corresponding machine vision program. In this example, a spray bottle cap is under inspection as indicated in 1506. A machine vision program 1502 associated with the inspection of the spray bottle cap is shown in the left portion of FIG. 15. In this machine vision program, the inspection may begin and enter state Read Product Select Lines, and may continue through states Load New Inspection and Start Inspection; subsequently, the machine vision program may enter states Read Digital Input and Check Product until the transition condition Stop Inspection is True. As described above, the current state, in this case, Check Product, has associated visual inspection steps, a portion of which can be seen in the lower right portion of FIG. 15, labeled 1504. Note that an inspection status may be displayed in the bottom right portion, e.g., as shown in FIG. 15.

Figure 16A:
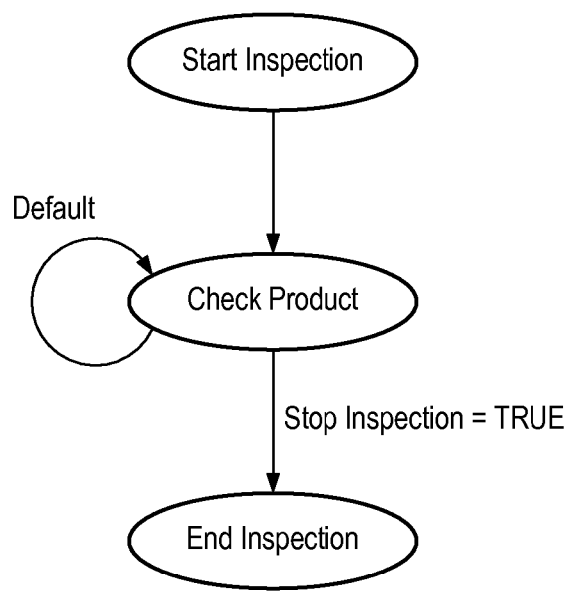
FIG. 16 illustrates various examples of machine vision programs, according to one embodiment of the invention.
Figure 16B:
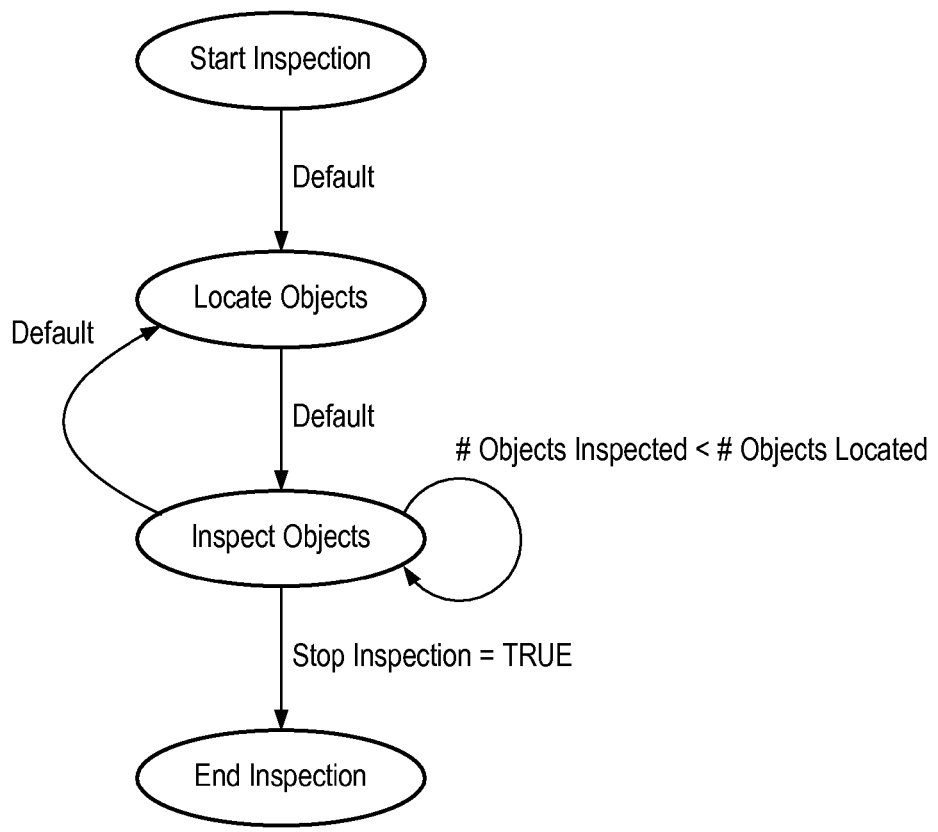
Figure 16C:
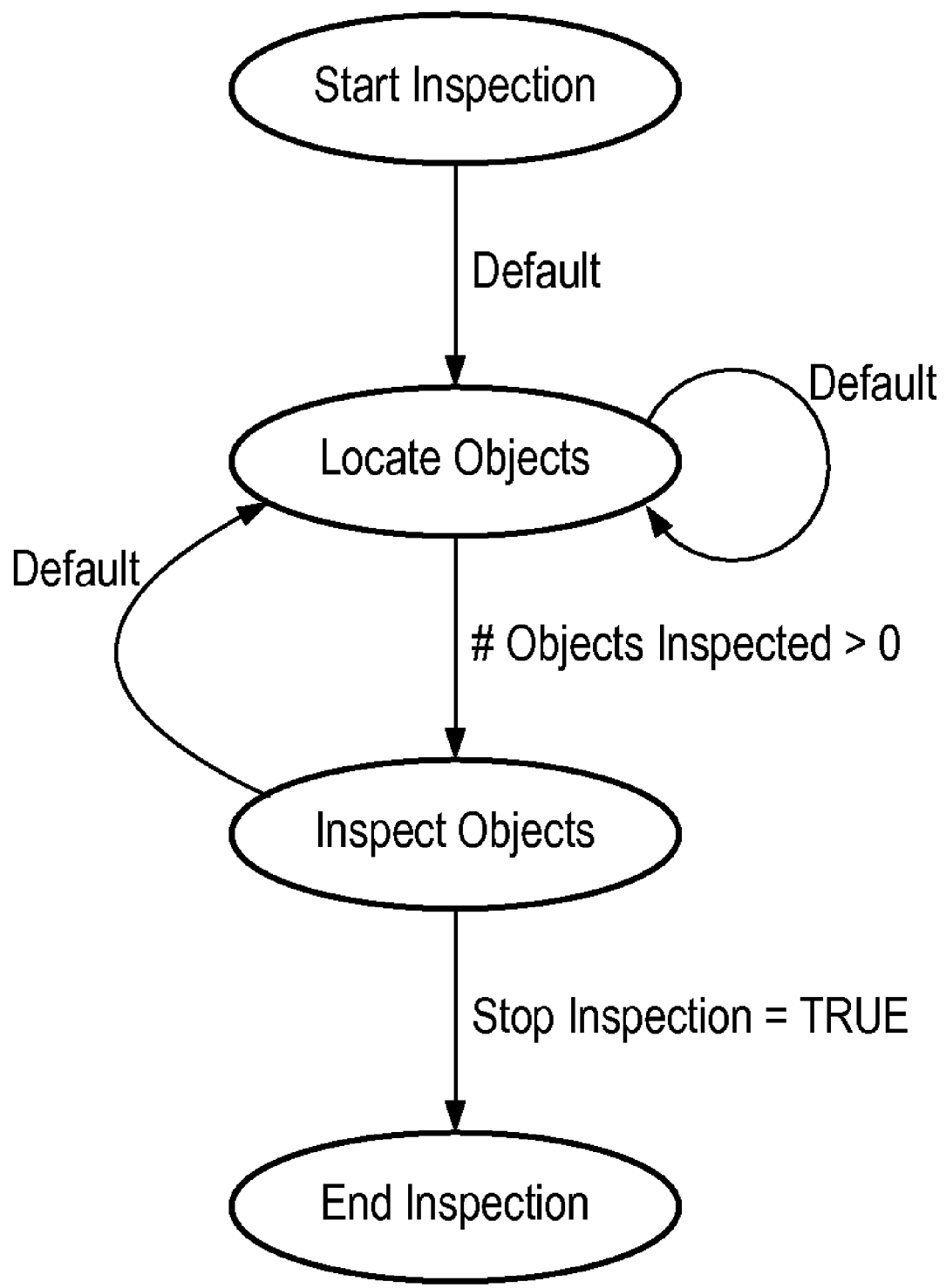
Figure 17:
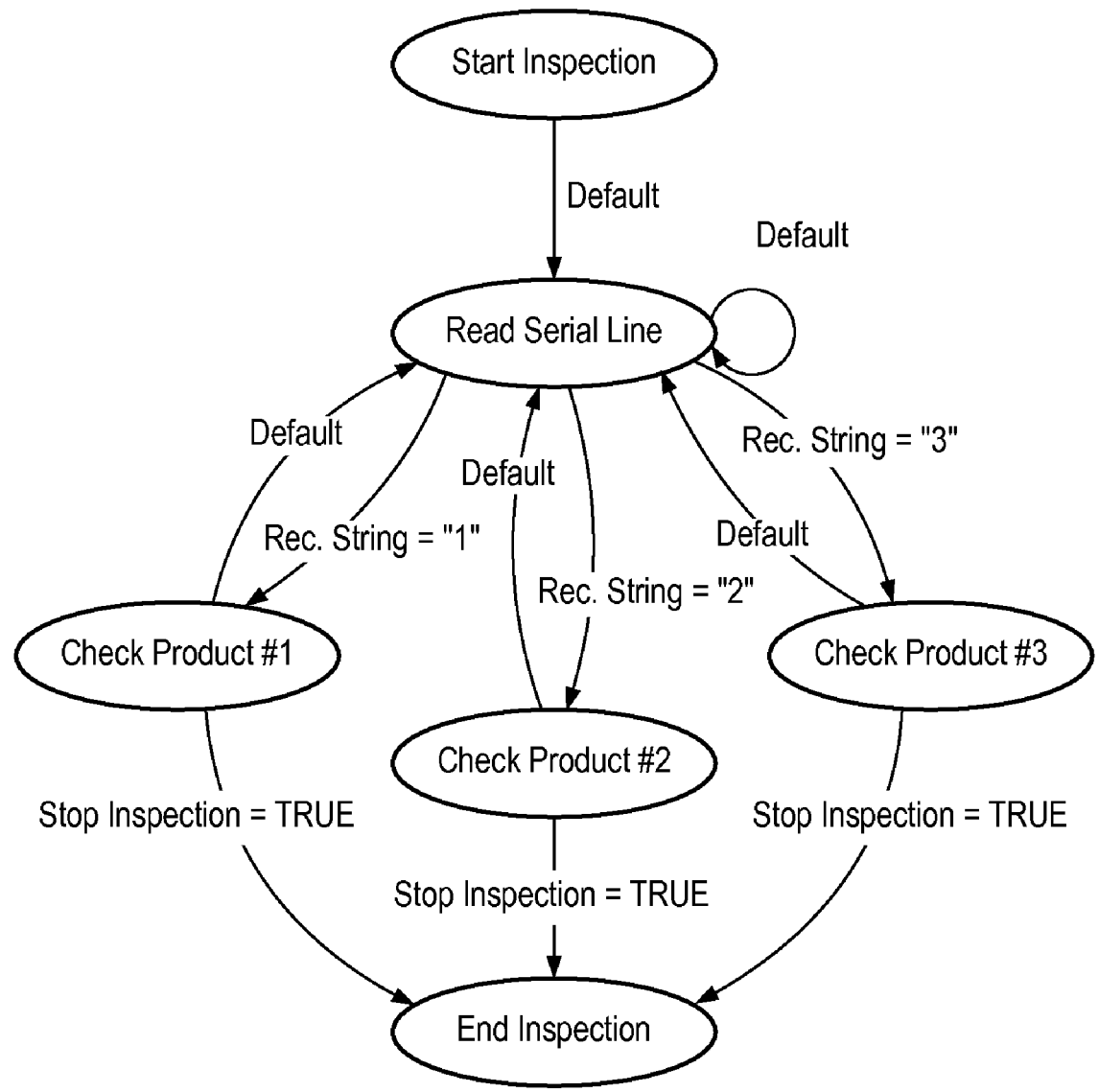
FIG. 17 illustrates a branched machine vision program, according to one embodiment of the invention.
Figure 18:
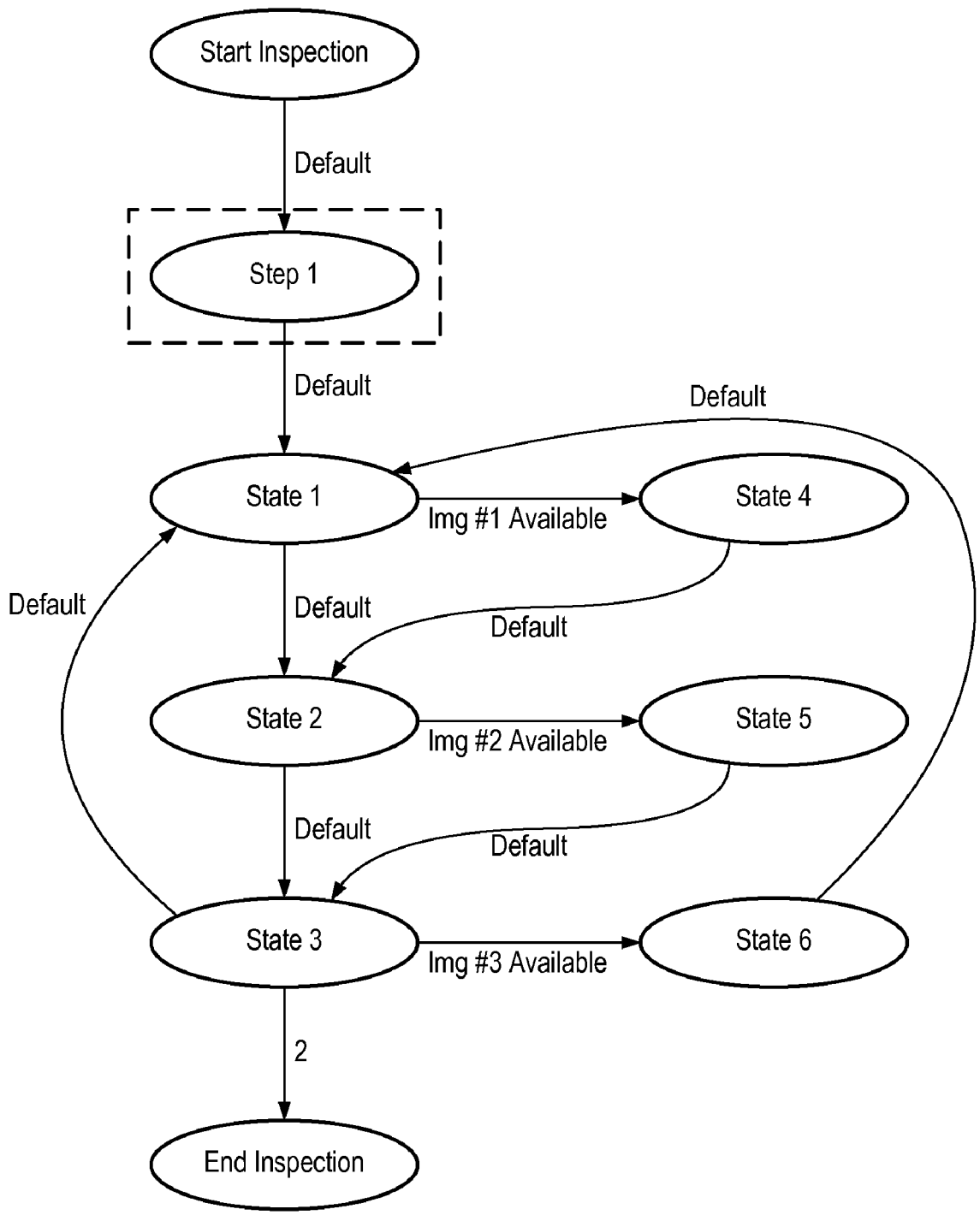
FIG. 18 illustrates a pseudo-parallel branched machine vision program, according to one embodiment.

FIG. 16-18—Exemplary State Diagrams

FIGS. 16-18 provide specific examples of state diagrams. FIG. 16 illustrates three linear state diagrams. More specifically, FIG. 16A illustrates a simple state diagram, where the inspection starts and the product is subsequently checked until the inspection ends. FIG. 16B discloses a simplified example of an iterative inspection. In this state diagram, multiple similar objects may be inspected as in the system of FIG. 9. The machine vision program may locate the object and subsequently inspect the object. In some instances, a soft trigger may be used, where further inspection steps may be applied only when an object presence is detected (e.g., Inspect Objects occurs only when the number of objects located is greater than zero) as exemplified in FIG. 16C. FIG. 17 illustrates a specific example of a branched state diagram. In this case, different states are accessible from Read Serial Line based on transition conditions. For example, Read Serial Line may transition to Check Product #1 when the value of Rec. String equals one. Similarly, Check Product #2 and Check Product #3 are accessible when the value of Rec. String is two or three respectively. Finally, FIG. 18 illustrates a specific example of a multiple-branched, pseudo-parallel inspection state diagram. In this case, multiple states are accessible when multiple images are available. For example, if the conditions Img #1 Available and Img #2 Available are both true, State 4 and State 5 are accessible to the machine vision program, and do not require a separate inspection. Note that embodiments are not limited to the above described state diagram instances.

Figure 19:
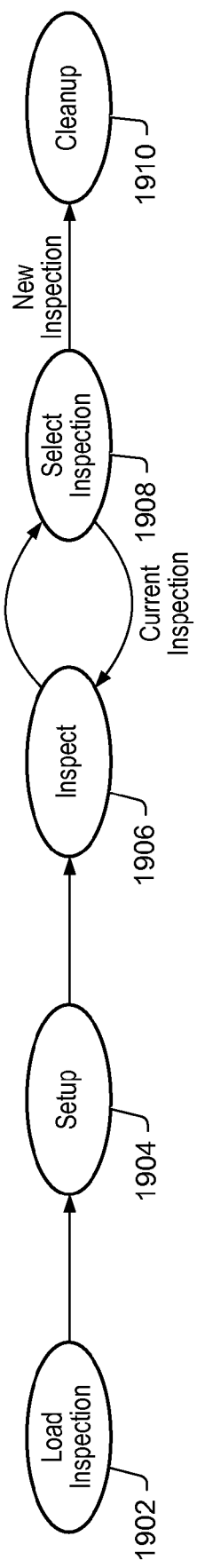
FIG. 19 illustrates an exemplary state diagram which may include another state diagram for implementing a portion of a machine vision process.

FIG. 19—Further State Diagram

In some embodiments, the state diagrams described above may be included in a further state diagram, e.g., possibly referred to as a super state diagram, overarching state diagram, general state diagram, or a process state diagram. FIG. 19 illustrates one such example of a state diagram which may include one or more of the state diagrams described above (such as, for example, the state diagram(s) generated using the method of FIG. 10). As shown, the state diagram may include a load inspection state 1902, a set up inspection state 1904, a inspect state 1906, a select inspection state 1908, and a cleanup state 1910. Note that various ones of these states may be omitted as desired. Additionally, further states and interconnections may be added or the states may be connected differently.

In some embodiments, each of these states may represent or include other state diagrams, such as those described above, among others. For example, the load inspection state 1902 and/or the setup state 1904 may include or represent a state diagram or other process diagram that may initialize machine vision process. More specifically, the setup state 1904 may represent a state diagram which may be used to initialize the I/O for the machine vision process. Similarly, the cleanup state may represent or include another state diagram which may specify sequence of operations to perform when closing the inspection. In one embodiment, the inspect state 1906 may represent or include the state diagrams described above, e.g., with respect to FIG. 10. Thus, when the inspect state 1906 is reached, the generated state diagrams, e.g., according to the method of FIG. 10, may be executed.

Note that in some embodiments, using the state diagram of FIG. 19 may preclude continuous looping in an individual inspection. This may allow the machine vision process software to know when the new inspection starts, count the number of iterations, count the number of inspected parts, allow "run inspection once" function types, and/or perform benchmarking processes, among others. Thus, in some embodiments, the user may only specify a single inspection cycle, and the state diagram of FIG. 19 may allow for multiple inspections, e.g., iterative looping inspections. Note that this embodiment is exemplary only, and, in fact, in other embodiments, the user may specify more than a single inspection cycle in the state diagrams described above. For example, FIG. 16A illustrates one state diagram which, by default, continually runs an inspection, e.g., without using the state diagram of FIG. 19. In other words, in one embodiment, FIG. 16A may show a state diagram where the user specifies more than a single inspection.

As described above, the state diagram of FIG. 19 may include a select inspection state 1908 which may allow the user to specify a new inspection, reload the current inspection, or load an existing inspection during execution of the machine vision process. As indicated above, the user may specify this via another state diagram or process diagram. Thus, the state diagram may be used, e.g., by the machine vision program, to continuously run at least one specified machine vision process.

Figure 20:
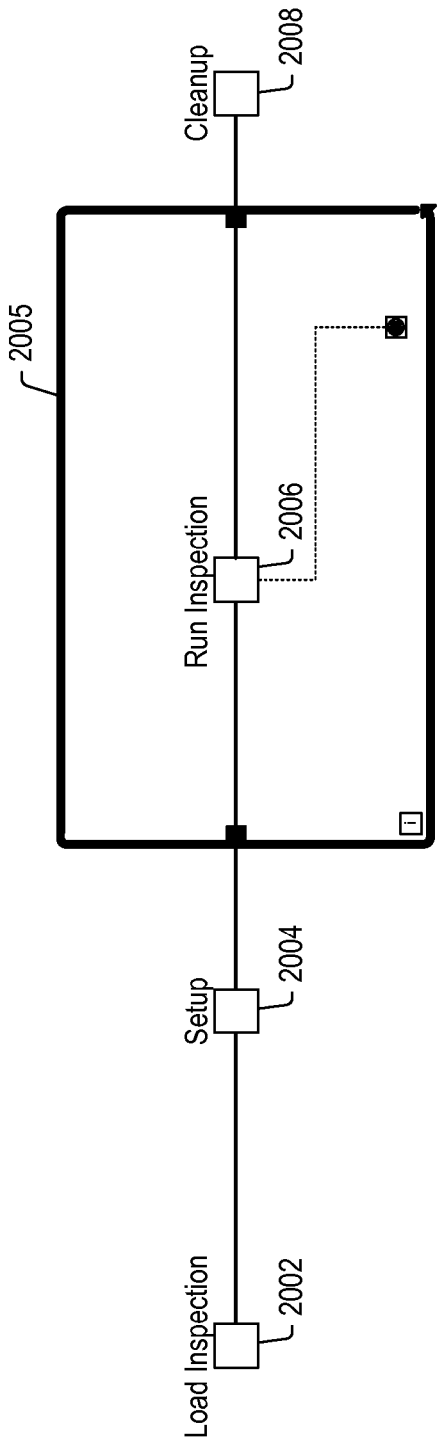
FIG. 20 illustrates an exemplary graphical program which may include a state diagram for implementing a portion of a machine vision process.

FIG. 20—Exemplary Graphical Program

Similar to the descriptions above regarding FIG. 19, the state diagrams described above may be included or represented in a graphical program. The graphical program may include a plurality of nodes and interconnections between the nodes which visually indicate functionality of the graphical program. In some embodiments, the graphical program may be a data-flow diagram, where the connections between the nodes indicate flow of data in the graphical program.

In some embodiments, similar to descriptions above regarding FIG. 19, a state diagram describing one iteration of a machine vision process may be represented in a while loop of a graphical program in order to iteratively perform the machine vision process. Similar to above, the exemplary graphical program of FIG. 20 may include a plurality of nodes. As shown, the graphical program may include a load inspection node 2002, a setup node 2004, a while loop structure 2005, a run inspection node 2006, and a cleanup node 2008. During execution, the graphical program may operate similar to that of the execution of the state diagram described above with respect to FIG. 19. Additionally, similar to above, the run inspection node 2006 may represent state diagrams described above, e.g., generated using the systems and methods described above, among others.

In further embodiments, the graphical program may further include other nodes (or possibly omit some of the nodes shown in FIG. 20). For example, the graphical program may include a conditional structure and a select inspection node, e.g., within the while loop 2005. In these embodiments, the conditional structure may determine if a new inspection should be loaded, and if so, the select inspection node may be executed, thereby allowing the machine vision process to change inspections during execution (or other possible inspection changes, such as those described above, among others).

Thus, various embodiments of the systems and methods disclosed herein may use a machine vision program in a machine vision system to more efficiently and flexibly perform machine vision routines. Additionally, the state diagram may utilize state transitions within the machine vision program to increase the usability of the machine vision system in performing machine vision routines.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A computer-implemented method for creating a state diagram which specifies a machine vision program, the method comprising:
   graphically assembling the state diagram on a display in response to user input, wherein said graphically assembling the state diagram comprises:
      receiving first user input selecting a first plurality of icons that represent states of the state diagram;
      receiving second user input associating machine vision steps with each of the first plurality of icons, wherein said associating comprises associating a plurality of machine vision steps with at least one icon of the first plurality of icons;
      receiving third user input configuring a first plurality of lines connecting various ones of the first plurality of icons, wherein the first plurality of lines represent state transitions between various ones of the first plurality of icons based on user specified conditions, wherein one or more of the user specified conditions depends on one or more characteristics of an object under inspection;
      wherein one or more of the first plurality of icons represent one or more additional diagrams that specify a machine vision or inspection routine;
   wherein the state diagram specifies the machine vision program, wherein the machine vision program is stored in a memory of the computer.

2. The computer-implemented method of claim 1, further comprising:
   displaying a second plurality of icons which correspond to a plurality of possible machine vision steps, wherein the second user input graphically associates one or more of the second plurality of icons with one or more of the first plurality of icons.

3. The computer-implemented method of claim 1, wherein the one or more additional diagrams include a second state diagram, wherein the second state diagram specifies additional states and transitions corresponding to the one or more of the first plurality of icons.

4. The computer-implemented method of claim 1, wherein the state diagram specifies a single inspection cycle, and wherein the method further comprises:
   placing the state diagram in a graphical program, wherein the graphical program provides for iterative execution of the state diagram.

5. The computer-implemented method of claim 4, wherein the graphical program is a data flow graphical program.

6. The computer-implemented method of claim 1, wherein the state diagram specifies a single inspection cycle, and wherein the method further comprises:
   placing the state diagram in a second state diagram, wherein the second state diagram provides for iterative execution of the state diagram placed therein.

7. The computer-implemented method of claim 1, wherein the user specified conditions comprise one or more of:
   whether the object under inspection is detected;
   dimension of the object under inspection;
   color of the object under inspection;
   intensity of the object under inspection;
   text of the object under inspection;
   barcode of the object under inspection;
   location of the object under inspection; or
   passing inspection.

8. The computer-implemented method of claim 1, further comprising:
   executing the machine vision program, wherein, during execution, the machine vision program performs the machine vision steps based on the user specified conditions.

9. The computer-implemented method of claim 8, wherein said executing the machine vision program comprises executing the machine vision steps for each state transition from a current state to a next state.

10. The computer-implemented method of claim 8, wherein during execution of the machine vision program, transitions between states are not executed until the user specified conditions are met.

11. A computer-accessible non-transitory memory medium for creating a state diagram which specifies a machine vision program, the memory medium comprising program instructions executable by a processor to:
   graphically assemble the state diagram on a display in response to user input, wherein said graphically assembling the state diagram comprises:
      receiving first user input selecting a first plurality of icons that represent states of the state diagram;
      receiving second user input associating machine vision steps with each of the first plurality of icons, wherein said associating comprises associating a plurality of machine vision steps with at least one icon of the first plurality of icons;

receiving third user input configuring a first plurality of lines connecting various ones of the first plurality of icons, wherein the first plurality of lines represent state transitions between various ones of the first plurality of icons based on user specified conditions, wherein one or more of the user specified conditions depends on one or more characteristics of an object under inspection;

wherein one or more of the first plurality of icons represent one or more additional diagrams that specify a machine vision or inspection routine;

wherein the state diagram specifies the machine vision program, wherein the machine vision program is stored in a memory of the computer.

12. The non-transitory memory medium of claim 11, wherein the program instructions are further executable to:
display a second plurality of icons which correspond to a plurality of possible machine vision steps, wherein the second user input graphically associates one or more of the second plurality of icons with one or more of the first plurality of icons.

13. The non-transitory memory medium of claim 11, wherein the one or more additional diagrams include a second state diagram, wherein the second state diagram specifies additional states and transitions corresponding to the one or more of the first plurality of icons.

14. The non-transitory memory medium of claim 11, wherein the user specified conditions comprise one or more of:
whether the object under inspection is detected;
location of the object under inspection; or
passing inspection.

15. The non-transitory memory medium of claim 11, wherein the state diagram specifies a single inspection cycle, and wherein the program instructions are further executable to:
place the state diagram in a graphical program, wherein the graphical program provides for iterative execution of the state diagram.

16. The non-transitory memory medium of claim 15, wherein the graphical program is a data flow graphical program.

17. The non-transitory memory medium of claim 11, wherein the state diagram specifies a single inspection cycle, and wherein the program instructions are further executable to:
place the state diagram in a second state diagram, wherein the second state diagram provides for iterative execution of the state diagram placed therein.

18. The non-transitory memory medium of claim 11, wherein the user specified conditions comprise one or more of:
whether the object under inspection is detected;
dimension of the object under inspection;
color of the object under inspection;
intensity of the object under inspection;
text of the object under inspection;
barcode of the object under inspection;
location of the object under inspection; or
passing inspection.

19. The non-transitory memory medium of claim 11, wherein the program instructions are further executable to:
execute the machine vision program, wherein, during execution, the machine vision program performs the machine vision steps based on the user specified conditions.

20. The non-transitory memory medium of claim 19, wherein in executing the machine vision program, the program instructions are executable to:
execute the machine vision steps for each state transition from the-a current state to a next state.

21. The non-transitory memory medium of claim 19, wherein during execution of the machine vision program, transitions between states are not executed until the user specified conditions are met.

* * * * *

UNITED STATES PATENT AND TRADEMARK OFFICE
CERTIFICATE OF CORRECTION

PATENT NO. : 7,864,178 B2
APPLICATION NO. : 11/550510
DATED : January 4, 2011
INVENTOR(S) : Marini et al.

Page 1 of 1

It is certified that error appears in the above-identified patent and that said Letters Patent is hereby corrected as shown below:

In the Claims:

Column 16, Claim 20,
Line 33, please delete "from the-a current state to a next state." and substitute -- from a current state to a next state. --.

Signed and Sealed this
Twenty-second Day of February, 2011

David J. Kappos
*Director of the United States Patent and Trademark Office*